(12) United States Patent
Takayama et al.

(10) Patent No.: US 7,099,119 B2
(45) Date of Patent: Aug. 29, 2006

(54) MAGNETIC HEAD, METHOD FOR RECORDING/REPRODUCING TAPE-LIKE MAGNETIC RECORDING MEDIUM, AND ROTARY MAGNETIC HEAD MECHANISM

(75) Inventors: Jun Takayama, Tokyo (JP); Yasuo Sugizaki, Kanagawa (JP); Masahiro Kanaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 350 days.

(21) Appl. No.: 09/980,887

(22) PCT Filed: Feb. 28, 2001

(86) PCT No.: PCT/JP01/01488

§ 371 (c)(1),
(2), (4) Date: Oct. 29, 2001

(87) PCT Pub. No.: WO01/65548

PCT Pub. Date: Sep. 7, 2001

(65) Prior Publication Data
US 2002/0159197 A1    Oct. 31, 2002

(30) Foreign Application Priority Data
Feb. 29, 2000   (JP)   .............................. 2000-053638

(51) Int. Cl.
*G11B 5/39*   (2006.01)
(52) U.S. Cl. .................................................. 360/271.6
(58) Field of Classification Search ............. 360/271.1, 360/271.2, 271.3, 271.4, 271.5, 271.6
See application file for complete search history.

(56) References Cited

U.S. PATENT DOCUMENTS

| | | | |
|---|---|---|---|
| 6,018,444 A | | 1/2000 | Beck et al. |
| 6,108,165 A | * | 8/2000 | Maruyama et al. ....... 360/271.5 |
| 6,122,147 A | * | 9/2000 | Fahimi et al. .............. 360/221 |
| 6,243,240 B1 | * | 6/2001 | Ozue et al. .............. 360/281.4 |
| 6,429,992 B1 | * | 8/2002 | Ozue et al. .................... 360/66 |
| 6,741,430 B1 | * | 5/2004 | Kikuiri ....................... 360/320 |
| 2002/0080533 A1 | * | 6/2002 | Ozue et al. ................. 360/313 |

FOREIGN PATENT DOCUMENTS

| | | |
|---|---|---|
| CN | 1163448 | 10/1997 |
| CN | 1244700 A | 2/2000 |

(Continued)

*Primary Examiner*—A. J. Heinz
*Assistant Examiner*—Mark Blouin
(74) *Attorney, Agent, or Firm*—Frommer Lawrence & Haug LLP; William S. Frommer; Thomas F. Presson

(57) ABSTRACT

To provide a magnetic head, a recording/reproducing method for a tape magnetic recording medium and a rotary magnetic head mechanism. A flat head FH1 is mounted on a rotary drum DR1 capable of allowing a magnetic tape MT to run thereon, and a smooth flat surface PL1 that faces the magnetic tape MT and produces hydrodynamic interference with the magnetic tape MT is provided on a flat head FH1, and a head element HE1 that contacts the magnetic tape MT and produces magnetic interference is provided in the area where the magnetic tape MT contacts the smooth flat surface PL1.

3 Claims, 12 Drawing Sheets

FOREIGN PATENT DOCUMENTS

| | | |
|---|---|---|
| DE | 199 63 917 A1 | 7/2000 |
| EP | 0 913 813 A2 | 5/1999 |
| EP | 0 977 178 A2 | 2/2000 |
| JP | 57195361 | 12/1982 |
| JP | 63-239606 | 10/1988 |
| JP | 63239606 | 10/1988 |
| JP | 7 169156 | 7/1995 |
| JP | 8-203042 | 8/1996 |
| JP | 9-330509 | 12/1997 |
| JP | 10 21607 | 1/1998 |
| JP | 10154307 | 6/1998 |
| JP | 11 102555 | 4/1999 |
| JP | 11-242803 | 9/1999 |
| JP | 2000-48314 | 2/2000 |
| JP | 2000-207800 | 7/2000 |

\* cited by examiner

US 7,099,119 B2

MAGNETIC HEAD, METHOD FOR RECORDING/REPRODUCING TAPE-LIKE MAGNETIC RECORDING MEDIUM, AND ROTARY MAGNETIC HEAD MECHANISM

This Application is a 371 of PCT/JP01/01488 Feb. 28, 2001.

TECHNICAL FIELD

The present invention relates to a magnetic head, a recording and reproducing method for a tape magnetic recording medium, and a rotary magnetic head mechanism.

BACKGROUND ART

As an apparatus for recording and reproducing signals on/from a tape magnetic recording medium, a rotary drum type of video cassette recorder apparatus is widely used wherein a track is formed at an inclined angle for record on the tape magnetic recording medium by the magnetic head which is mounted on the rotating drum, and reproducing is also performed by tracing this inclined track. Above all, in recent years, a rotary drum type of VTR apparatus of the digital standards has come into wide use.

As an example of the tape magnetic recording medium, a coat-type of magnetic tape is available. Its structure is such that a magnetic layer or a magnetic surface is formed on a plastic substrate coated with needle-like or fine grain magnetic particles by a binder which is an adhesive agent. As to the magnetic surface, as the recording is performed in high density, its coercive force Hc and its residual magnetic flux density Br tend to increase. In the case of the MP tape of the DV standards, for example, the coercive force Hc reaches 2300 oersted and the residual magnetic flux density Br reaches 3000 gauss.

On the other hand, the size of a magnetic particle simple substance is micronized to a degree of 0.1×1.0 μm in the case of a coat-type metal tape. Moreover, a tape thickness becomes thinner from the tape thickness of approximately 10 to 16 μm adopted in the conventional editing machine because of the demand for a compact tape cassette and a long time recording and reproducing. In the case of the tape magnetic recording medium for digital video signals of the DV standard, the tape has a thickness of 7 to 8 μm.

Accordingly, the apparatus for recording and reproducing on/from the magnetic tape having such characteristics needs to be elaborately designed on both hydrodynamic interference function in relation to the control of physical contact with the magnetic tape and magnetic interference function in relation to the recording and reproducing.

As an example of such a magnetic tape recording/reproducing apparatus, the conventional rotary drum type head for recording and reproducing on/from the magnetic tape medium while rotating adopts a magnetic head according to the magnetic induction principle. This magnetic head has both the magnetic poles opposed to each other by keeping a narrow head gap in-between and the magnetic surface of the magnetic tape medium is disposed orthogonal to this head gap in the closest position. At the time of recording, when the lines of magnetic force generated by driving both the magnetic poles reach from one magnetic pole to the other magnetic pole through the head gap and the magnetic surface, the magnetic substance constituting the magnetic surface is magnetized so that the recording is performed, while at the time of reproducing, a leakage magnetic flux generated from the magnetic substance constituting the magnetic surface of the magnetic tape medium is caught by both the magnetic poles through the head gap and an electromotive force generated by electromagnetic induction when the medium fluctuates while moving is detected so that the reproducing is performed.

In order to enhance the recording density and to improve a S/N ratio, adherence of the magnetic tape medium to the head gap is required and, furthermore, maintaining a steady movement of the tape while keeping the adherence is required.

In the conventional configuration, in order to realize the above described adherence state, a contact pressure is obtained by pressing the magnetic tape medium against the head gap and, above all, the rotary drum type head is constituted in such a manner that the above described contact pressure, so-called "contact" is obtained by a tensile force given to the magnetic tape medium. FIG. 10 is a schematic view explaining the configuration of such a conventional rotary drum type head. FIG. 11 is a diagram viewed from the direction of arrow A in FIG. 10 and FIG. 12 is a diagram viewed from the direction of arrow B in FIG. 10.

As shown in each drawing, a rotary drum type head 100 disposes a magnetic head 104 having a head gap 103 in a head window 102 caved in so as to open a part of the cylindrical surface of a cylindrical rotary drum 101 and rotates at a predetermined velocity in the rotational direction 106. With this rotation, the magnetic head 104 also moves at the same velocity. On the magnetic tape medium 105 along the rotary drum 101, a tensile force 107 is given, and pulled by this tensile force 107, the magnetic tape medium is pressed against the head gap 103 and advances at the velocity slower than that of the magnetic head 104 in the same direction. Moreover, at the bottom of this rotary drum 101, there is disposed a cylindrical fixed drum 111 at a short distance apart.

Here, in order to improve a contact state between the head gap 103 and the magnetic tape medium 105, a surface 108 which contacts the magnetic tape medium 105 existing in the vicinity of the head gap 103 is constituted as a curved surface of a convex curvature 109 in the recording track direction, that is, in the magnetic tape running direction and moreover constituted as a curved surface of a convex curvature 110 in the track width direction also and moreover the surface 108 is constituted as projecting from the cylindrical surface of the rotary drum 101 together with the head gap 103.

When the magnetic tape medium 105 contacts the magnetic head 104 thus constituted by pressure attributable to the tensile force 107, the magnetic tape medium 105 is deformed in the convex shape along the surface 108 of the magnetic head 104 so as to improve the contact state. Moreover, the part in which the magnetic head 104 does not contact the magnetic tape medium 105 is sometimes deformed by influences of the clearance between the head window 102, the rotary drum 101 and the fixed drum 111.

As described above, the rotary drum type head 100 as conventionally constituted gives the sufficient tensile force 107 to the magnetic tape medium 105 and by this tensile force 107 the magnetic tape medium 105 is compulsively pressed against the convex magnetic head 104 so as to improve the contact state, and by practicing magnetic interference between the magnetic head 104 and the magnetic tape medium 105 the magnetic recording or reproducing is performed.

However, as a result of pressing the magnetic tape medium 105 compulsively against the convex magnetic head 104 as described above, the problems arise that the head gap 103 is worn and the head gap life is shortened. Other problems also arise that the magnetic surface of the magnetic tape medium 105 is also worn and the tape life is shortened due to non-reversal deformation.

Hence, in order to lengthen the life of the head, in the conventional configuration, a depth of the head gap 103, that is, a gap was designed to be deep enough to dispose a margin there. According to this configuration, for example, at the initial stage, the gap is set to 20 to 30 μm so that the time until the gap depth reduces to the limit value due to wear is lengthened and the life of the head is extended.

However, the configuration where the initial gap depth is deeply set presents the problems in that the improvement of sensitivity has a limit, a high density recording is controlled and a high density reproducing has a limit. Moreover, it did not have any effect on solving the problem of the shortened life of the tape.

Moreover, it also does not realize a means with which an MR head and a GMR head of the magnetic resistance effect type (or magnetic flux response type) having a configuration where the magnetic field changes on the recording medium are detected with an extremely shallow gap by utilizing the magnetic resistance effect, which are mainly applied in a hard magnetic disc drive (HDD), can be applied in the tape magnetic recording medium in place of the magnetic head based on the above described magnetic induction principle.

DESCRIPTION OF THE INVENTION

The present invention is made to solve the problems in the above described conventional technology, and its object is to provide the magnetic head and the recording and reproducing method for the tape magnetic recording medium and the rotary magnetic head mechanism which are capable of extending the life of the head and the life of the tape by maintaining an excellent contact state between the head and the tape medium while reducing the contact pressure so as to reduce wear, and which are applicable to the tape medium of the magnetic resistance effect type head.

In order to solve the problems of the conventional technology, the magnetic head according to claim 1 of the present invention is a magnetic head which is mounted on a rotary drum capable of allowing the tape magnetic recording medium to run thereon and moves with the rotation of the rotary drum so as to record on the tape magnetic recording medium, or to reproduce from the tape magnetic recording medium. The magnetic head comprises: a surface for facing the tape magnetic recording medium and for producing hydrodynamic interference with the tape magnetic recording medium while moving by the above rotation; and a recording/reproducing portion for producing magnetic interference by contacting the tape magnetic recording medium, wherein the surface is a smooth flat surface, and the recording/reproducing portion is placed in an area where the tape magnetic recording medium contacts the surface by the hydrodynamic interference and moreover is provided so as to perform at least either recording or reproducing by magnetic interference by contacting the tape magnetic recording medium.

According to the above described configuration, the surface is a smooth flat surface and hence, according to Bernoulli's law, pressure reduction is generated between the smooth flat surface and the approached tape magnetic recording medium and as a result the tape magnetic recording medium gradually approaches and contacts the surface. In this way, only by the pressure reduction effect without applying compulsive force, the contact pressure to the recording/reproducing portion is secured so that friction is controlled and recording or reproducing is performed.

The magnetic head according to the claim 2 of the present invention is mounted on the rotary drum capable of allowing the tape magnetic recording medium to run thereon and moves with the rotation of the rotary drum so as to perform recording on the tape magnetic recording medium, or to perform reproducing from the tape magnetic recording medium. The magnetic head comprises: a surface for facing the tape magnetic recording medium and for producing hydrodynamic interference with the tape magnetic recording medium while moving by the above rotation; and a recording/reproducing portion for producing magnetic interference with the tape magnetic recording medium in a non-contact state. The surface is a smooth flat surface, and the recording/reproducing portion is placed outside the area where the tape magnetic recording medium contacts the surface by hydrodynamic interference and moreover is provided so as to perform at least either recording or reproducing by magnetic interference with the tape magnetic recording medium in a non-contact state.

According to the above described configuration, the surface is the smooth flat surface and hence, according to Bernoulli's law, pressure reduction is generated between the smooth flat surface and the approached tape magnetic recording medium and as a result the tape magnetic recording medium gradually approaches and contacts the surface. In a steady state, the position of the contact point is stabilized and the distance to the tape magnetic recording medium in the portion immediately before the contact position is a steady value and a steady non-contact state is maintained. Accordingly, when a recording/reproducing portion of a non-contact type, for example, a reproducing head element of a magnetic resistance detection system is arranged at this position, even in the case of a rotary magnetic recording, recording/reproducing is performed in a non-contact state on/from the tape magnetic recording medium.

The magnetic head according to claim 3 of the present invention is the head according to claim 1 or claim 2, wherein the surface for facing the tape magnetic recording medium has the smooth curved surface having the curvature gentler than the curvature of the rotary drum and therefore the pressure reduction effect depends on the shape or smoothness of the surface and, when the gentleness is the same, the pressure reduction effect on the surface having a gentle smooth curvature becomes great. Accordingly, this enables the operation where the tape magnetic recording medium is brought into contact with the magnetic head by pressure reduction effect without bringing it into contact with the rotary drum or the operation where the tape magnetic recording medium is brought into contact with the rotary drum by light contact pressure, while bringing it into contact with the magnetic head by desired contact pressure generated by much stronger pressure reduction effect.

The recording and reproducing method for the tape magnetic recording medium according to claim 4 of the present invention is characterized in that the smooth flat surface or the smooth curved surface having the curvature gentler than the curvature of the above described rotary drum is provided on the surface of the rotary drum having a cylindrical surface, and moreover the recording/reproducing portion producing magnetic interference with the tape magnetic recording medium is provided on the above described smooth flat surface or the above described smooth curved surface, thereby allowing the above described tape magnetic recording medium to approach the above described rotating rotary drum, and the pressure reduction is occurred by hydrodynamic interference produced between the smooth flat surface or the smooth curved surface. Thereby, at least either recording or reproducing is performed by bringing the above described recording/reproducing portion into contact with the above described tape magnetic recording medium, or at least either recording or reproducing is performed by making the distance between the above described tape magnetic recording medium and the above described recording/reproducing portion to be shorter than the maximum distance capable of producing mutual magnetic interference.

According to the above described recording/reproducing method, since the surface is the smooth flat surface or the smooth curved surface having the gentle curvature, pressure reduction is generated between the surface and the approached tape magnetic recording medium according to Bernoulli's law. As a result, the tape magnetic recording medium gradually approaches and contacts the surface. Thereby, the recording/reproducing portion is put into a contact state with the tape magnetic recording medium, and only by pressure reduction effect without applying compulsive force, the contact pressure is secured so that friction is controlled and recording or reproducing is performed.

Moreover, when it is in a steady state, the contact point is stabilized and a floating distance of the tape magnetic recording medium in the portion immediately before the contact position is a steady value and a steady non-contact state is maintained. Accordingly, when a recording/reproducing portion of non-contact type, for example, a reproducing head element of a magnetic resistance detection system is arranged at this position, even in the case of a rotary magnetic recording, recording/reproducing is performed in a non-contact state on/from the tape magnetic recording medium.

The rotary magnetic head mechanism according to claim 5 of the present invention comprises a rotary drum having a cylindrical surface for allowing the tape magnetic recording medium to run thereon and having the magnetic head so as to rotate. The magnetic head comprises a surface for facing the tape magnetic recording medium and for producing hydrodynamic interference with the tape magnetic recording medium while the above described rotary drum rotates, and a recording/reproducing portion for performing at least either recording or reproducing by producing the magnetic interference with the tape magnetic recording medium, wherein the surface is a smooth flat surface, a recording/reproducing portion is placed on the surface in an area where the tape magnetic recording medium contacts the surface by hydrodynamic interference and, the height of each portion of the magnetic head is constituted so as not to exceed the height of the cylindrical surface of the rotary drum.

According to the above described configuration, the surface is the smooth flat surface and hence, pressure reduction according to Bernoulli's law is generated by the hydrodynamic interference between the smooth flat surface and the approached tape magnetic recording medium and as a result the tape magnetic recording medium gradually approaches and contacts the surface. Thereby, only by pressure reduction effect without giving compulsive force, the contact pressure to the recording/reproducing portion is secured so that friction is controlled and recording or reproducing is performed.

The rotary magnetic head mechanism according to claim 6 of the present invention comprises the rotary drum having a cylindrical surface which allows the tape magnetic recording medium to run thereon and having the magnetic head so as to rotate. The magnetic head comprises a surface for facing the tape magnetic recording medium and for producing hydrodynamic interference with the tape magnetic recording medium while the above described rotary drum rotates, and a recording/reproducing portion for performing at least either recording or reproducing by producing magnetic interference with the tape magnetic recording medium. The surface is a smooth flat surface, the recording/reproducing portion is placed on the surface in an area where the tape magnetic recording medium contacts the surface by hydrodynamic interference, and the magnetic head is placed so as to project from the cylindrical surface of the rotary drum.

According to the above described configuration, the projection of the magnetic head from the cylindrical surface of the rotary drum easily makes the tape magnetic recording medium contact the projected magnetic head, whereby an air flow formed in the vicinity of the rotary drum accompanied by the rotation is prevented from flowing into the smooth flat surface by the tape magnetic recording medium. On the other hand, pressure reduction according to Bernoulli's law is generated by hydrodynamic interference between the smooth flat surface and the approached tape magnetic recording medium and this pressure reduction is effectively performed by preventing the air flow in the vicinity of the rotary drum from flowing into the smooth flat surface as described above so that the tape magnetic recording medium rapidly approaches and contacts the surface. In this way, the contact is made at a shorter distance, thereby making the magnetic head compact.

Moreover, only by pressure reduction effect without applying compulsive force, the contact pressure to the recording/reproducing portion is secured so that friction is controlled and recording or reproducing is performed.

The rotary magnetic head mechanism according to claim 7 of the present invention comprises the rotary drum. The rotary drum comprises a cylindrical surface for allowing the tape magnetic recording medium to run thereon, a concave window portion having an opening on the cylindrical surface, a magnetic head disposed inside the window portion, and a concave channel formed between the window portion wall surface and the magnetic head wall surface. The magnetic head comprises the surface for facing the tape magnetic recording medium and for producing hydrodynamic interference with the tape magnetic recording medium while the rotary drum rotates, and a recording/reproducing portion for performing at least either recording or reproducing by producing magnetic interference with the tape magnetic recording medium. The surface is a smooth flat surface, the recording/reproducing portion is provided on the surface in an area where the tape magnetic recording contacts the surface by hydrodynamic interference, and the height of each portion of the magnetic head is constituted so as not to exceed the height of the cylindrical surface of the rotary drum.

According to the above described configuration, by negative pressure generated by concave channel, the passing tape magnetic recording medium is pulled and a locus moves inward so that the tape magnetic recording medium approaches or contacts the magnetic head and the air flow induced from the channel is controlled or shut out and the air flow formation on the magnetic head is controlled.

Moreover, since the surface of the magnetic head is the smooth flat surface, pressure reduction according to Bernoulli's law is generated by hydrodynamic interference between the smooth flat surface and the approached tape magnetic recording medium and as a result the tape magnetic recording medium approaches and contacts the surface. Thereby, only by pressure reduction effect without applying compulsive force, the contact pressure to the recording/reproducing portion is secured so that friction is controlled and recording or reproducing is performed.

The rotary magnetic head mechanism according to claim 8 of the present invention comprises the rotary drum. The rotary drum comprises a cylindrical surface for allowing the tape magnetic recording medium to run thereon, a concave window portion having an opening on the cylindrical surface; a magnetic head provided inside the window portion, and a concave channel formed between the window portion wall surface and the magnetic head wall surface. The magnetic head comprises the surface for facing the tape magnetic recording medium and for producing the hydrodynamic interference with the tape magnetic recording medium while the rotary drum rotates and a recording/reproducing portion for performing at least either recording or reproducing by producing magnetic interference with the tape magnetic recording medium. The surface is a smooth flat surface, the recording/reproducing portion is provided on the surface in an area where the tape magnetic recording medium contacts the surface by hydrodynamic interference, and the magnetic head is provided so as to project from the cylindrical surface of the rotary drum.

According to the above described configuration, by the action of negative pressure generated on the concave channel, the passing tape magnetic recording medium is pulled and the locus moves inward, with the magnetic head projected from the cylindrical surface, so that the tape magnetic recording medium more effectively approaches and contacts a magnetic head end portion, and the air flow drawn out from the channel is controlled or shut out and the air flow formation on the magnetic head is effectively controlled.

Moreover, since the surface of the magnetic head is the smooth flat surface, pressure reduction according to Bernoulli's law is generated by hydrodynamic interference between the smooth flat surface and the approached tape magnetic recording medium, while on the other hand, accompanied by the control of the air flow formation, the tape magnetic recording medium rapidly approaches and contacts the surface. Thereby, only by pressure reduction effect without applying compulsive force, the contact pressure to the recording/reproducing portion is secured so that friction is controlled and recording or reproducing is performed.

In the rotary magnetic head according to claim 9 is the head according to claim 5, 6, 7 or 8, the above described surface facing the above described tape magnetic recording medium is a smooth curved surface having the curvature gentler than the curvature of the above described rotary drum and therefore the above described pressure reduction effect depends on the shape or gentleness of the surface and, when the gentleness is the same, the pressure reduction effect on the surface having a smooth curvature becomes great. This enables the operation where the tape magnetic recording medium is brought into contact with the magnetic head by pressure reduction effect without bringing it into contact with the rotary drum or the operation where the tape magnetic recording medium is brought into contact with the rotary drum by light contact pressure, while bringing it into contact with the magnetic head by desired contact pressure generated by much stronger pressure reduction effect.

BEST MODE FOR CARRYING OUT THE INVENTION

Hereinafter, the preferred embodiments of the present invention will be described with reference to the attached drawings. It should be noted that the embodiments described hereinafter are a part of the preferred embodiments for showing the principal configuration and the effect of the present invention and therefore, though there are some cases where various preferable restrictions are imposed in technical points of view, the scope of the present invention is not restricted to these embodiments unless any particular mention is made of any restriction to be imposed on the present invention in the following description.

Figure 1:
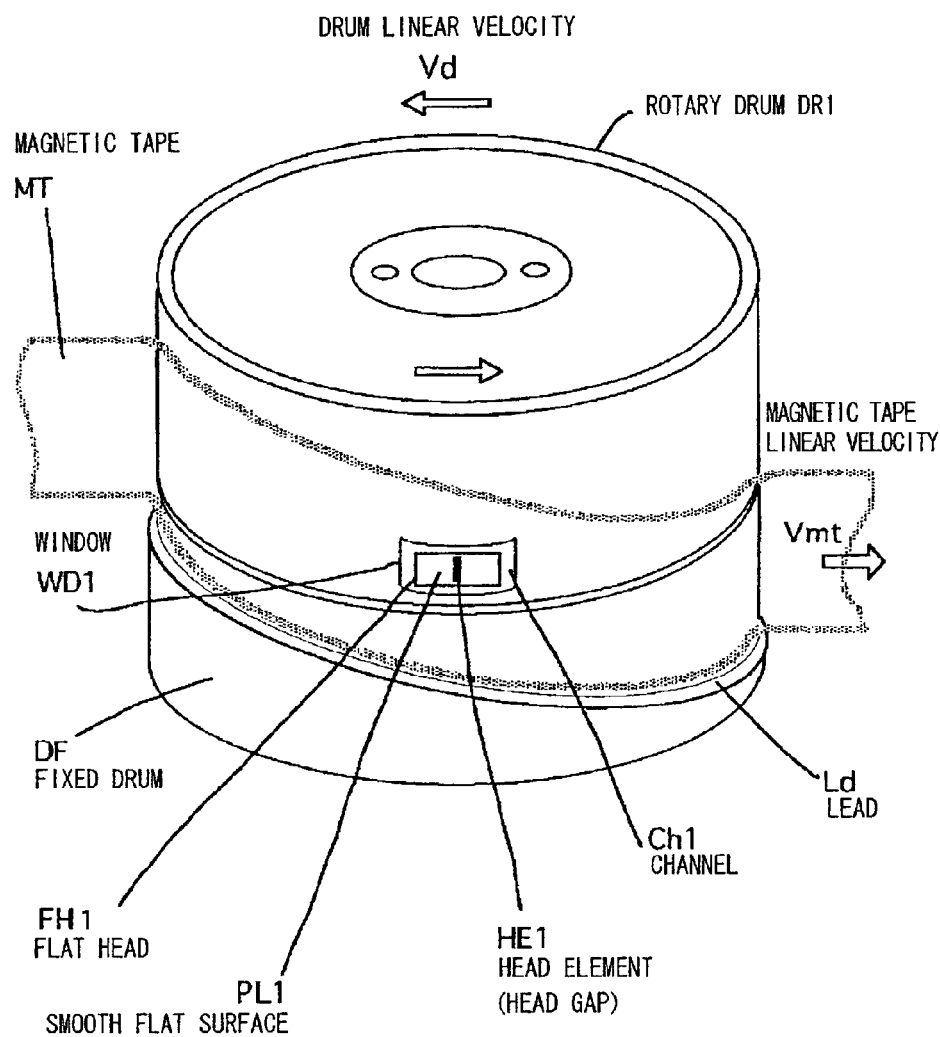
FIG. 1 is a schematic perspective view showing principal components of a first embodiment of a rotary magnetic head mechanism of the present invention.

FIG. 1 is a schematic perspective view showing the principal elements of a first embodiment of the rotary magnetic head mechanism of the present invention.

Figure 2:
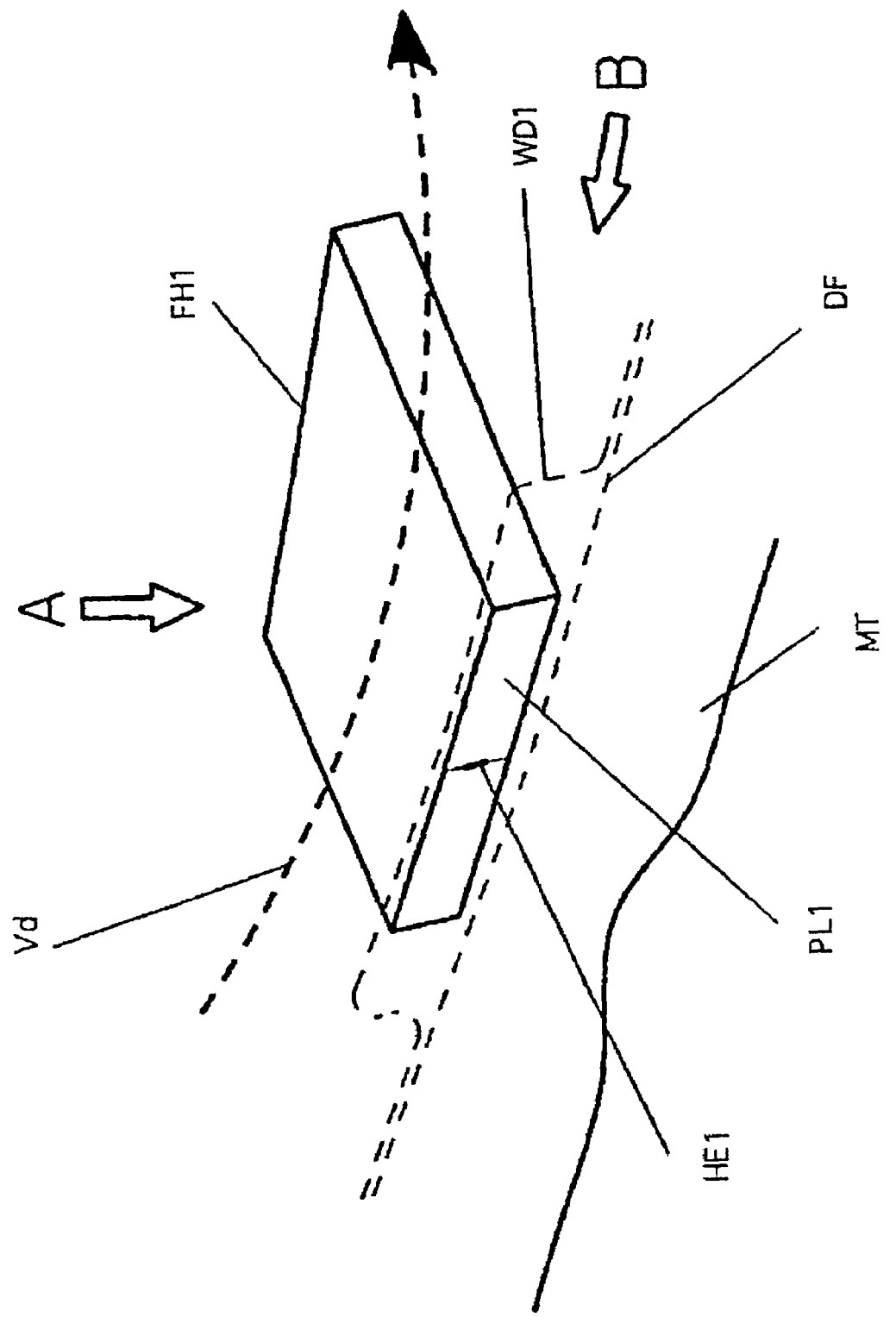
FIG. 2 is an explanatory drawing of the configuration of a magnetic head shown in FIG. 1, which is one embodiment of the present invention.

FIG. 2 is an explanatory drawing of the configuration of the magnetic head shown in FIG. 1, which is also one embodiment of the present invention.

Figure 3:
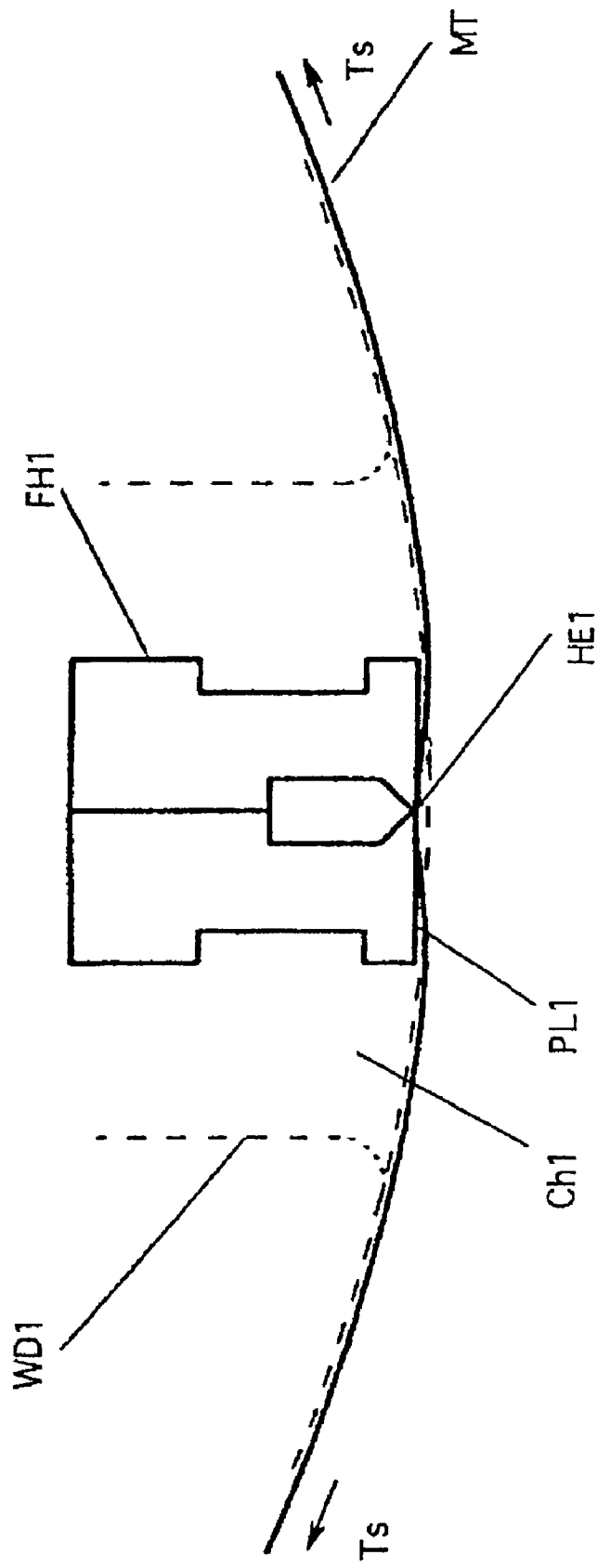
FIG. 3 is a diagram viewed from the direction of arrow A in FIG. 1.

FIG. 3 is a view seen from an arrow A in FIG. 2

Figure 4:
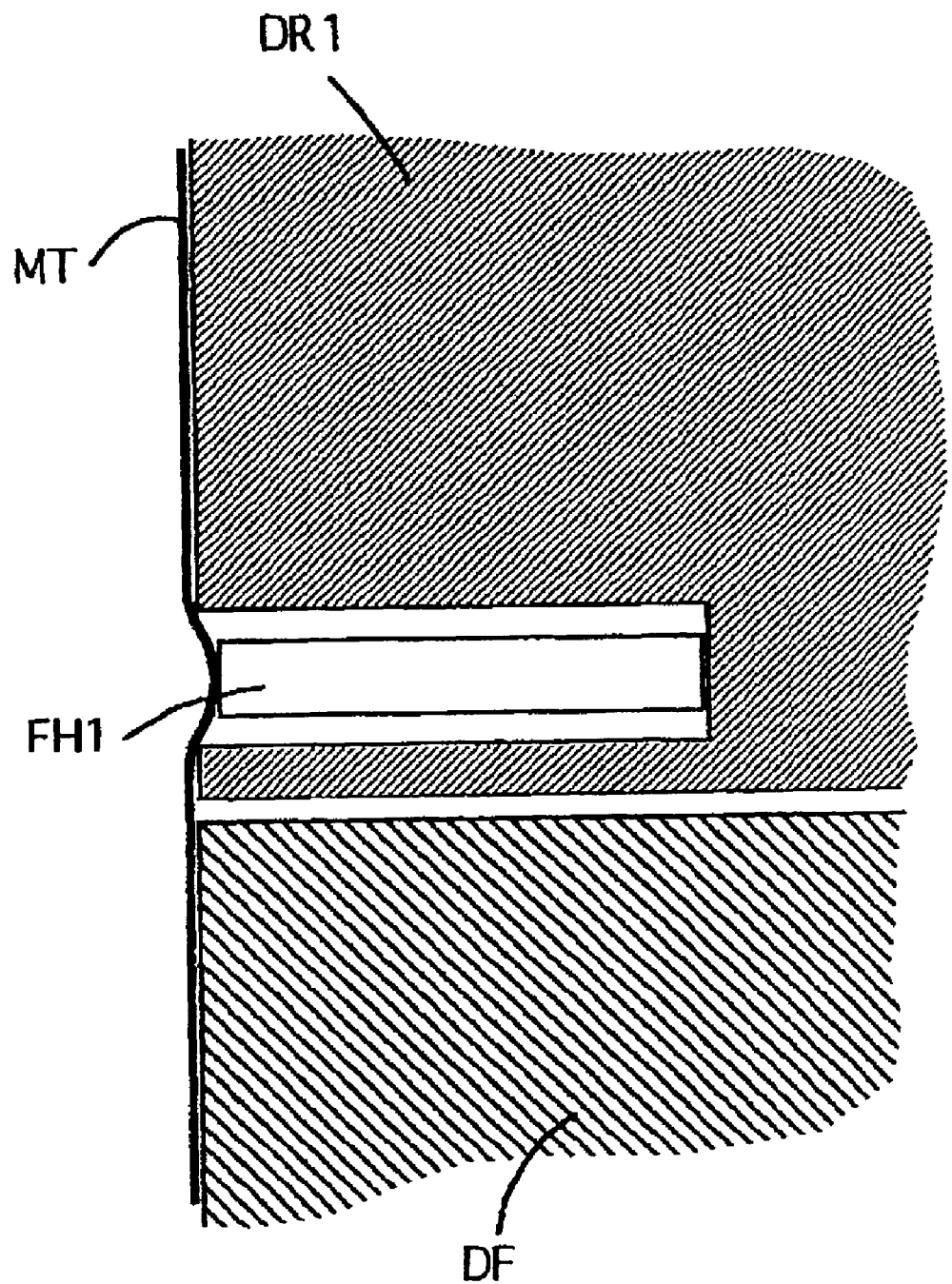
FIG. 4 is a diagram viewed from the direction of arrow B in FIG. 1.

FIG. 4 is a view seen from an arrow B in FIG. 2

Hereinafter, the rotary magnetic head mechanism RHA1 will be described with reference to FIG. 1 to FIG. 4.

As shown in FIG. 1, the rotary magnetic head mechanism RHA1 of the present invention is constructed such that a cylindrical rotary drum DR1 and a fixed drum DF each having a cylindrical surface with approximately the same diameter are coaxially arranged with one edges of both drums faced each other having a small gap. The rotary drum DR1 is a rotatable upper drum and the fixed drum DF is a lower drum fixed on a chassis or a frame.

The rotary drum DR1 has the rotatable cylindrical surface with an axis as a center, and a plurality of windows WD1 are disposed at predetermined positions on the lower part of this cylindrical surface, and a flat head FHI is formed in each window WD1. Note that in order to make the illustration simple, other windows and flat heads are omitted in the drawing.

As shown in FIG. 1 to FIG. 4, the flat head FH1 is rectangular and its edge has the same height as the window WD1, that is, is on the same level as the cylindrical surface and the flat head FH1 is set slightly smaller than the window WD1. As a result, a concave channel Ch1 is formed between the flat head FH1 and the rotary drum DR1. The flat head FH1 is made of magnetic substances such as ferrite, sendust and amorphous alloy and substrate material such as ceramics.

The portion of the flat head FH1 which faces a magnetic tape MT is a surface, and in the present embodiment, is a smooth flat surface PL1 (hereinafter referred to as flat surface PL1) processed so as to be smooth.

In addition, this surface may be a smooth curved surface having the curvature gentler than that of the rotary drum DR1. This surface operates so as to hydrodynamically interfere with the facing magnetic tape MT.

Moreover, the smooth flat surface PL1 of the flat head FH1 has a head element HE1 serving as a recording/reproducing portion made thereon so as not to project from the smooth flat surface PL1 (refer to FIG. 3). This head element HE1 has magnetic interference with the facing magnetic tape MT and performs recording or reproducing by making the magnetic surface of the magnetic tape MT approach or contact while the rotary drum DR1 rotates in a fixed direction at a drum linear velocity Vd. This head element HE1, for example in the case where the head is based on a magnetic induction principle as shown in FIG. 3, is formed as a head gap.

Moreover, on the fixed drum DF, as shown in FIG. 1, a lead Ld is formed for regulating a running path of the magnetic tape MT.

The magnetic tape MT (tape-type magnetic recording medium) runs along the lead Ld of the fixed drum DF at a given angle over the cylindrical surfaces of the rotary drum DR1 and the fixed drum DF and is wounded. In addition, it is given a tensile force Ts by a tensile force control means not shown, and runs at a magnetic tape linear velocity Vmt, to record/reproduce thereon/therefrom in a helical scanning system with the head element HE1 while the rotary drum DR1 rotates.

The linear velocity of the cylindrical surface is Vd when the rotary drum DR1 rotates and therefore the flat head FH1 also runs at the linear velocity Vd. The magnetic tape MT runs in the same direction, at the linear velocity Vmt slower than the linear velocity Vd. The difference between these linear velocities is a virtual velocity of the flat head FH1 with respect to the magnetic tape MT.

Note that, though the structure as shown above comprises a single rotary drum DR1 and a single fixed drum DF disposed thereunder, it is not limited to this, but the magnetic head mechanism comprising three or more drums, for example, may be utilized, which represents a middle drum rotational type.

Figure 5:
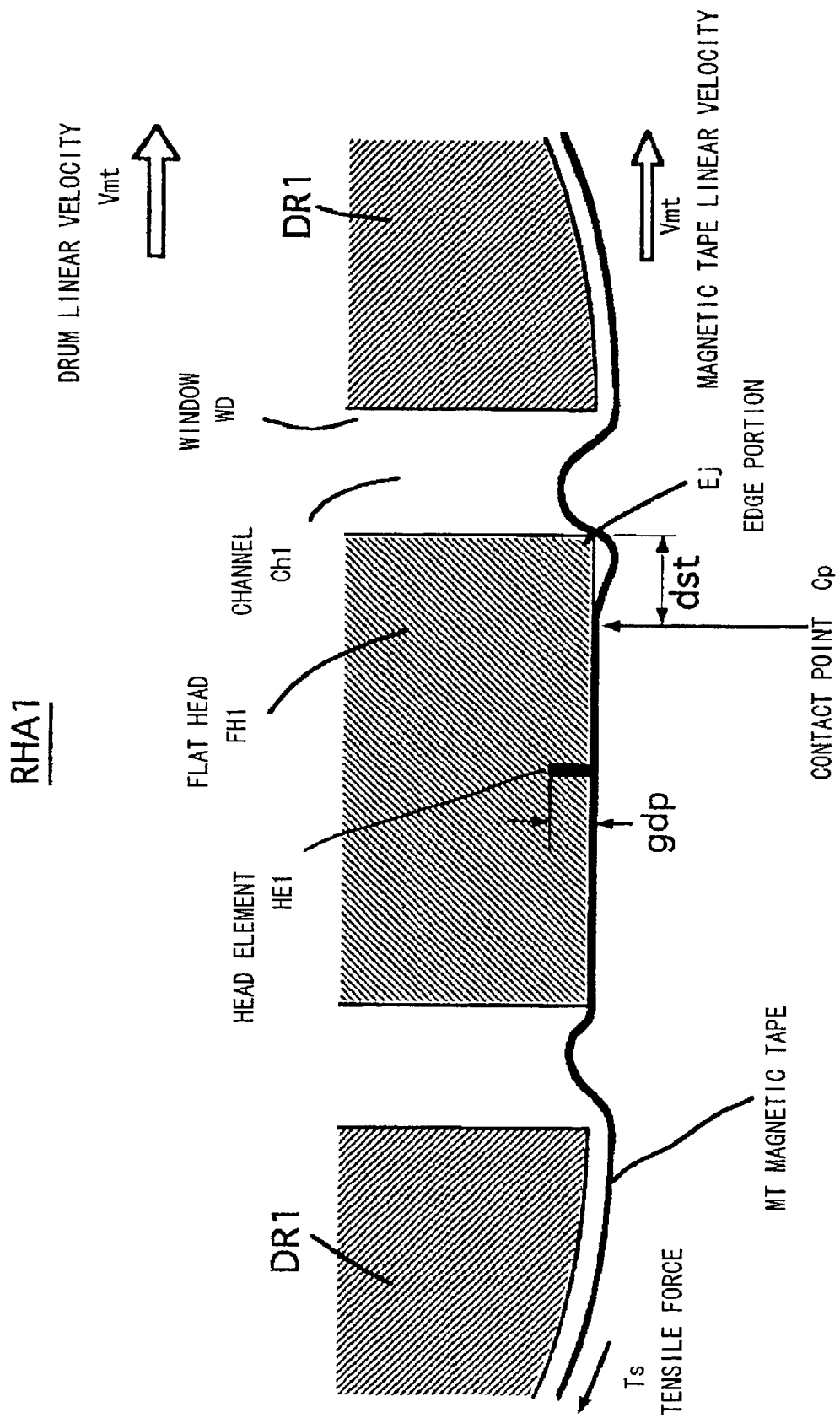
FIG. 5 is an explanatory drawing of a loading state of a magnetic tape when a rotary drum as shown in FIG. 1 rotates.

FIG. 5 is a drawing explaining a loading state of the magnetic tape when the rotary magnetic head as shown in FIG. 1 rotates.

Figure 6:
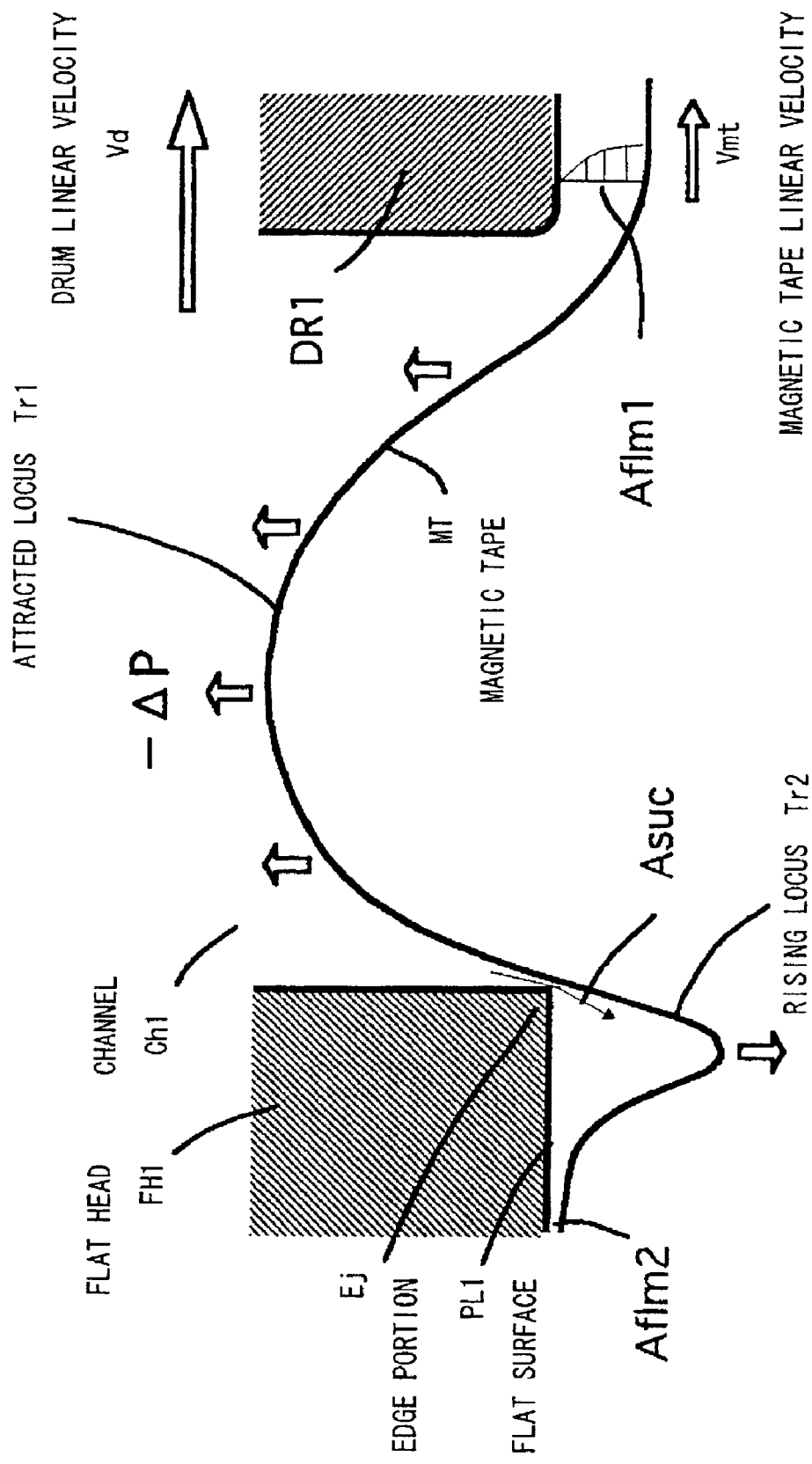
FIG. 6 is a principle explanatory drawing of a rotary magnetic head mechanism of the present invention.

FIG. 6 is a principle drawing explaining the rotary magnetic head mechanism of the present invention.

Hereinafter, the operation of the rotary magnetic head mechanism RHA1 will be described with reference to FIG. 5 and FIG. 6.

First, assuming a no-loading state where the magnetic tape MT is not loaded, rotating of the rotary drum DR1 forms an air layer (air film) on the outer peripheral surface of the rotary drum DR1 and the flat head FH1. For example, a relative velocity with respect to the rotary drum DR1 of the air closest to the surface of the rotary drum DR1 is zero and hence a first thin air layer contacting the outer peripheral surface in the air film moves at the same linear velocity as the surface of the rotary drum DR1, while a second thin air layer above the first air layer in the air film is unable to maintain the linear velocity of the first thin air layer and move at the slower linear velocity, due to air viscosity. Which means that a relative velocity with respect to the outer peripheral surface is generated. Hence, a delay occurs by the relative velocity.

Similarly, the third thin air layer and subsequent thin air layers gradually increase the absolute value of the relative velocity and hence gradually increase the delay. Therefore, the n-th thin air layer which is farthest from the outer peripheral surface in the same air film has the maximum absolute value of the relative velocity. Then, just at the time when it has the same absolute value of the linear velocity as the first thin air layer, the air film disappear and the air is an environmental air (static air) having a linear velocity of zero.

Here, the air layers inside the air film transits its states from a layer basin formed by the air layer close to the end surface to a turbulent basin as it is far from the end surface.

The rotary drum in a no-loading state continues to rotate while forming the air film on the outer peripheral surface and, the magnetic tape is to be wound on the outer peripheral surface of this drum. Accordingly, the air film is formed on the head disposed on the outer peripheral surface too. However, the head does not always face the loaded magnetic tape, but while the rotary drum rotates at high rotational velocity, for example, the head faces the magnetic tape for a half round for recording and reproducing and does not face the magnetic tape for the other half round to recover the air film by contacting the environmental air. Then, for the subsequent half round, the head faces the magnetic tape for recording and reproducing again.

Here, when the magnetic tape comes closer to the outer peripheral surface of the rotary drum rotating at a high velocity, hydrodynamic interference is generated between the outer peripheral surface of the rotary drum and the magnetic tape. In the Bernoulli's law (law of energy conservation in a broad sense), the sum of kinetic energy and pressure of the air is kept constant. Assuming that a symbol  represents square, it is expressed as $P + v2/2\rho = \text{const}$ Where the $\rho$ is a ratio of the air. Note that a potential term is omitted.

The first thin air layer which is the layer flow closest to the outer peripheral surface, in the air film formed on the outer peripheral surface of the rotary drum, is stationary with respect to the outer peripheral surface and has a velocity difference of zero with the outer peripheral surface of the rotary drum, as described above. Therefore, the apparent kinetic energy with respect to the outer peripheral surface is zero and hence no apparent pressure difference with the outer peripheral surface is produced according to the Bernoulli's law. The floating head of HDD (hard magnetic disc drive) utilizes this effect. In the present invention, however, the magnetic tape is attracted to and brought into contact with the outer peripheral surface and this contact pressure is utilized by a contact type head or the magnetic interference is produced in no-contact with the magnetic tape by the non-contact type head arranged at a position offset from the contact point, which requires such a configuration as to produce hydrodynamic interference for reducing or eliminating as much as possible the air layer having a small pressure difference in the vicinity of the outer peripheral surface.

On the other hand, the operations by the channel Ch1 can be described as follows, for example.

In the above described rotational state, there is no air film in the channel Ch1 between the rotary drum DR1 and the flat head FH1. However, since the channel Ch1 moves at a high velocity against the environmental air, when the channel Ch1 is considered, the high velocity moving flow of the environmental air ought to pass through the opening part of the channel Ch1. The channel Ch1 has a tiny concave portion and therefore negative pressure ($-\Delta P$) is generated due to Venturi effect and the pressure inside the channel Ch1 is reduced. This pressure reduction occurs by drawing out the air inside the channel Ch1.

The fluid in the vicinity of the concave channel Ch1 rotating at the high velocity is extremely complex even in a steady state in relation to the formation of eddy current and the like. If it is considered by a macro expression, the above described drawn out air flow flows with a fluid path formed along the channel Ch1 end surface, so as to be drawn outside of the channel Ch1, while the environmental air is introduced inside the channel Ch1 at a central portion having a low path resistance in the opening portion of the channel Ch1 and this difference is considered to produce a steady negative pressure.

Next, the case where the rotary drum DR1 is given a load by the magnetic tape MT loaded thereon will be described.

The magnetic tape MT running at a slow velocity on the cylindrical surface of the rotary drum DR1 is pulled by a tension arm which is not shown and disposed at the tape winding side, hence it is given a tensile force Ts. The conventional rotary head has such a configuration that this tensile force (tension) is set strong so that the magnetic tape MT is compulsively pressed against the rotary head so as to contact it. In the present embodiment, however, the magnetic tape MT is given a suitable tensile force Ts which does not compulsively press it against the rotary head. In this configuration, when the magnetic tape MT is in the steady state where it moves on the rotary drum DR1 along the air film formed in the on-load state, an air film Aflm1 and an air film Aflm2 are formed respectively in the vicinity of the outer peripheral surface of the rotary drum DR1 and the end portion of the flat head FH1 as shown in FIG. 6. Note that, the air films Aflm1 and Aflm2 are not the same as the above described air film in the no-load state because of the presence of the loaded magnetic tape MT. For example, the air film Aflm1 which is formed between the rotary drum DR1 and the magnetic tape MT is thinner than the above described air film in the no-load state because of the tensile force Ts given to the magnetic tape MT. Further, the magnetic tape MT can always run contacting the rotary drum DR1 by adjusting the tensile force Ts so as to break the air film Aflm1.

By the way, as a result of an experiment, such a locus can be seen that the magnetic tape MT rises on the flat surface PL1 of the flat head FH1 when passing the edge Ej of the flat head FH1 from the channel Ch1, peaks, and then approaches the flat surface PL1 of the flat head FH1 (refer to FIG. 5 and FIG. 6). This phenomenon can be explained as follows.

The channel Ch1 is formed so as to be perpendicular to the flow line of the air flow and its effect is explained based on the effect of the Venturi tube, wherein a pressure drop (negative pressure $-\Delta P$) is generated inside the channel Ch1 because of the Venturi effect and by this pressure drop the magnetic tape MT is attracted to the bottom of the channel Ch1 in the direction shown by arrows in FIG. 6 and as a result, the moving locus of the magnetic tape MT gets near to the bottom of the channel Ch1. This is taken as an attracted locus Tr1. At this time, as described above, the drawn out air flow Asuc (refer to FIG. 6) is steadily generated from the channel Ch1 to the flat surface PL1 of the flat head FH1 and becomes a supply source of a part of the air which forms the air film Aflm2.

When the magnetic tape MT comes near to the edge portion Ej which is the corner of the flat head FH1 along this attracted locus Tr1, the drawn out air flow Asuc partially flows into an area formed between the flat surface PL1 of the flat head FH1 and the magnetic tape MT and transiently stays there, which is a factor for rising the locus of the magnetic tape MT.

After this rise, the formation of the air film Aflm2 on the flat surface PL1 is controlled because the magnetic tape MT is in a position of covering the flat surface PL1.

On the other hand, since the magnetic tape MT has stiffness, the magnetic tape MT after passing the edge portion Ej is to rise perpendicularly to the flat surface PL1 of the flat head FH1, which is another factor of rising the locus of the magnetic tape MT.

While, since the tensile force Ts which is given to the magnetic tape MT controls the above described deflection of the magnetic tape MT as a factor for controlling the rise of the locus.

Here, the pressure reduction occurring according to the Bernoulli's law between the flat surface PL1 of the flat head FH and the magnetic tape MT acts as a force of attracting the magnetic tape MT to the flat surface PL1 of the flat head FH1.

The result of the above described each factor and acting force can be explained in such a way that the rising locus Tr2 (refer to FIG. 6) is formed where the magnetic tape MT on the flat surface PL1 of the flat head FH1 passing the edge portion Ej, rises up, peaks, and then gradually comes near to the flat surface PL1 of the flat head FH1.

When the magnetic tapes MT comes further nearer from the above described state, it contacts the edge portion Ej and the drawn out air flow Asuc is shut off. Thereby, the amount of the air entering on the flat surface PL1 of the flat head FH1 is reduced and in addition, the magnetic tape MT is in the position of covering the flat surface PL1, so that the formation of the air film Aflm2 on the flat surface PL1 is effectively controlled. Moreover, the area formed by the rise of the magnetic tape MT, that is, the area formed between the magnetic tape MT on the expanded locus Tr2 and the flat surface PL1 of the flat head FH1 is suddenly formed and therefore becomes the pressure reduction state.

Note that in the above description the edge portion Ej has not only an acute angle, but also a curvature capable of protecting the magnetic tape MT.

Next, as shown in FIG. 5, in addition to the aforementioned pressure reduction in rising area, the Bernoulli effect is very effective on the flat surface PL1 which is smooth and flat, in which the magnetic tape MT rapidly comes near to the flat surface PL1 as it gets farther from the edge portion Ej along the flat surface PL1 and breaks the remaining air film Aflm2, so that it contacts the flat surface PL1 at a contact point Cp.

Since the continuation of the contact state after this contact depends on factors such as disposing angles of the flat surface PL1 as well as smoothness and flatness of the flat surface PL1, each of the above described factors is set so that the contact is continued sufficiently enough to produce magnetic interference with the magnetic tape MT by the head element HE1, that is, to steadily perform recording and reproducing.

Accordingly, the present embodiment is realized such that the head element HE1 is positioned further behind than the contact point Cp. This positioning makes the head element HE1 always and steadily contact the magnetic tape MT.

This contact of the magnetic tape MT to the edge portion Ej of the flat head FH1 controls the formation of the air film Aflm2 and, the formation of a new air film Aflm2 on the flat surface PL1 is controlled by the magnetic tape MT approaching the flat surface PL1 on the flat head FH1 afterwards, whereby the Bernoulli effect further effectively works so as to contact the magnetic tape MT to the flat face PL1 soon and in a short distance.

As a result, a distance dst (refer to FIG. 5) between the contact point Cp of the magnetic tape MT to the flat surface PL1 and the edge portion Ej, that is, the corner of the flat head FH1 can be shortened, thus making it possible to minimize the head.

The present embodiment applies the magnetic induction head for the flat head FH1. The head element HE1 is the head gap and its position is set at a position after the contact point Cp as shown in FIG. 5, that is, at a position in the opposite direction to the edge portion Ej from the contact point Cp, so that the head element HE1 can maintain a steady contact state with the magnetic tape MT.

Moreover, as to the contact pressure to the head element HE1, as described above, in the present embodiment, the pressure reduction effect according to the Bernoulli's law is utilized in contact of a large area of the magnetic tape MT to the flat surface PL1 of the flat head FH1, so that the contact pressure to the head element HE1 can be sufficiently reduced and yet the contact pressure which is not a problem for magnetic induction effect can be steadily produced. Accordingly, for example, as there is no need for the magnetic tape to be compulsively pressed against the head by the tensile force, unlike the conventional configuration, friction of the head is extremely minimized, resulting in solving problems due to the friction of the head. In addition, not only the life of the head can be lengthen, but also the life of the tape can be lengthen by avoiding a non-reversal deformation of the magnetic tape MT because of a small load thereto.

Moreover, since the friction of the head is minimized, a gap gdp as shown in FIG. 5 can be formed so as to be small, for example, to a degree of a few microns or less, thereby being capable of improving a head performance and to perform a high density recording/reproducing at high sensitivity.

Moreover, since the friction of the head is minimized, even if the magnetic tape is brought into contact with the head, a MR head and a GMR head of the magnetic resistance effect type (or magnetic flux response type) can be applied, which detects a change in the magnetic field on the recording medium by an extremely shallow gap by using magnetic resistance effect.

In the above, even if a channel exists, when its depth is small compared with its width and therefore not enough negative pressure is formed, a locus movement of the magnetic tape by the above described negative pressure is little and the drawn out air flow at the edge portion is not shut out. However, this is the same operation described later in FIG. 8.

Moreover similarly, even when the locus movement of the magnetic tape having a great stiffness at the time of passing the channel is little, the operation is the same as described later in FIG. 8.

By the way, in the configuration of the above described embodiment, the edge portion of the flat head FH1 has the same height as the cylindrical surface of the rotary drum DR1. In the configuration of a second embodiment, however, the flat head can be disposed also so as to project from the cylindrical surface of the rotary drum DR1. According to this configuration, in the case of applying the magnetic tape having a great stiffness which is one of factors determining the above described tape locus, the factor attributable to this stiffness becomes dominant and, together with the negative pressure effect by the channel, the magnetic tape is easier to contact with the projected magnetic head portion, thereby enabling to shut out the air flow drawn out from the channel much earlier and effectively. As a result, the formation of the air film on the surface of the flat head is more effectively controlled and the breaking of the air film by the magnetic tape on the smooth flat surface becomes much easier and the distance to the contact point can be shortened.

Here, even if a channel exists, when its depth is small compared to its width and therefore not enough negative pressure is formed, though the locus movement of the magnetic tape by the above described negative pressure is little, if the factor attributable to stiffness of the magnetic tape is dominant as described above, the magnetic tape contacts the corner of the projected magnetic head, thereby shutting out the drawn out air flow at the edge portion. This is the same as the operation described later in FIG. 9.

Figure 7:
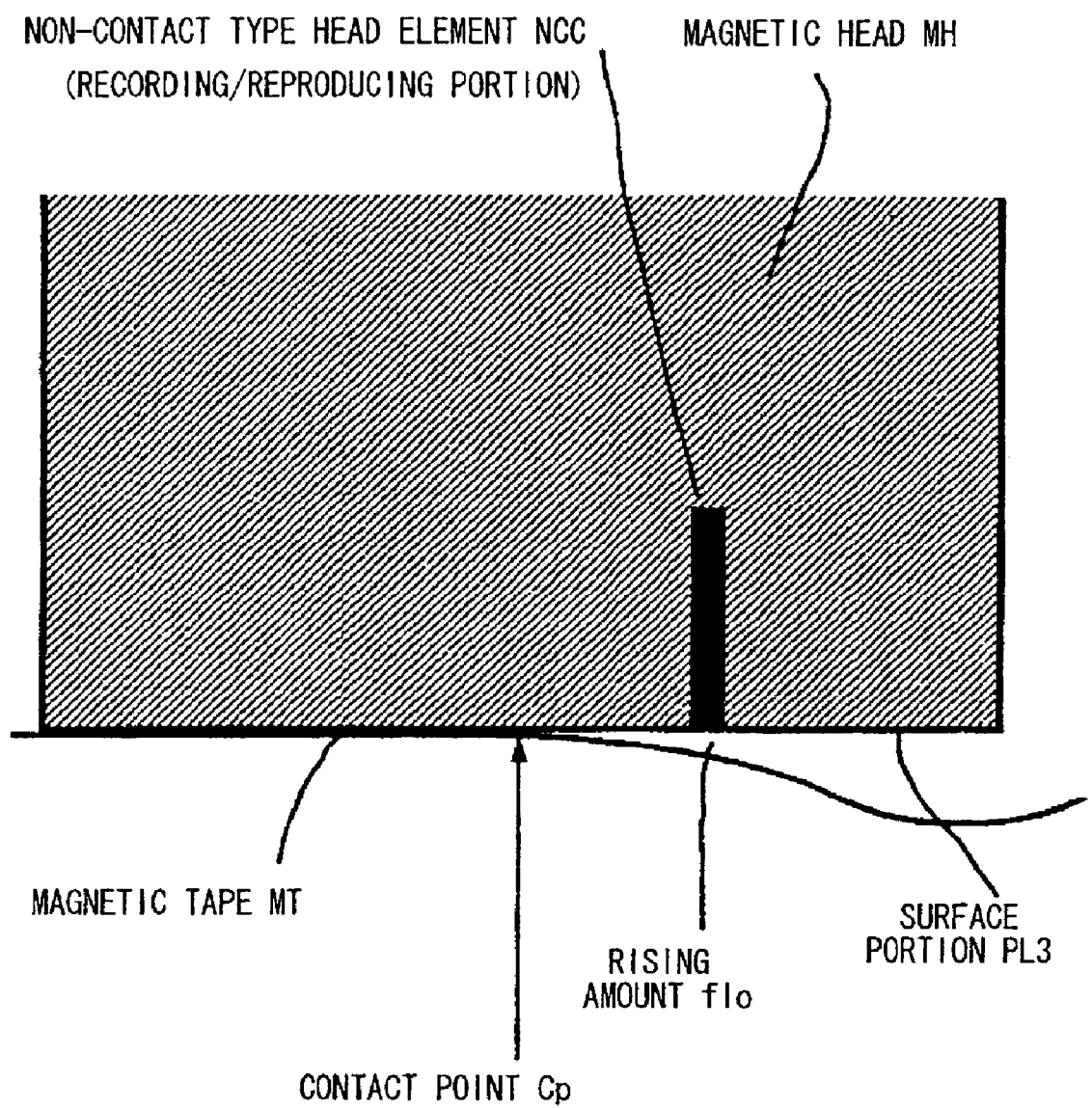
FIG. 7 is a principle explanatory drawing of a third embodiment of the rotary magnetic head mechanism of the present invention.

FIG. 7 is a schematic drawing of the principal components of a third embodiment of the rotary magnetic head mechanism of the present invention.

In the present embodiment, the magnetic head MH comprises a surface PL3 which attracts and contacts with the magnetic tape MT by generating hydrodynamic interference with the magnetic tape MT while moving rotationally facing the magnetic tape MT, and a non-contact type head element NCC as a recording/reproducing portion which h generates magnetic interference in a non-contact state with the magnetic tape MT.

This surface PL3 may be a smooth flat surface or a curved surface having a gentle smooth curvature and the non-contact type head element NCC is disposed outside the range where the magnetic tape MT contacts with the surface PL3 by hydrodynamic interference.

According to this configuration, by the surface PL3 being a smooth flat surface or having a smooth curvature, the pressure reduction is produced between the surface PL3 and the approached magnetic tape MT and therefore the magnetic tape MT gradually approaches the surface PL3 and contacts the surface PL3 at a contact point Cp. In a steady state, the position of the contact point Cp is steady and therefore at the position slightly before the contact point Cp on the surface PL3, the distance up to the magnetic tape MT is a steady value. At this position, the magnetic MT tape steadily floats with a floating amount flo and therefore a steady non-contact state of the magnetic tape MT is maintained at this position.

Accordingly, by disposing the non-contact type head element NCC, for example, the reproducing head element of a magnetic resistance detection system at this position, in rotary magnetic recording, the head surface portion PL3 can contact with the magnetic tape MT, and the non-contact type head element NCC for performing the magnetic interference with the magnetic tape MT can be kept a non-contact state with the magnetic tape MT, so that recording/reproducing on/from the magnetic tape MT can be performed in a non-contact state. As a result, the non-contact type head including the MR head and the GMR head can be applied to the rotary magnetic recording apparatus with the magnetic tape MT.

Figure 8:
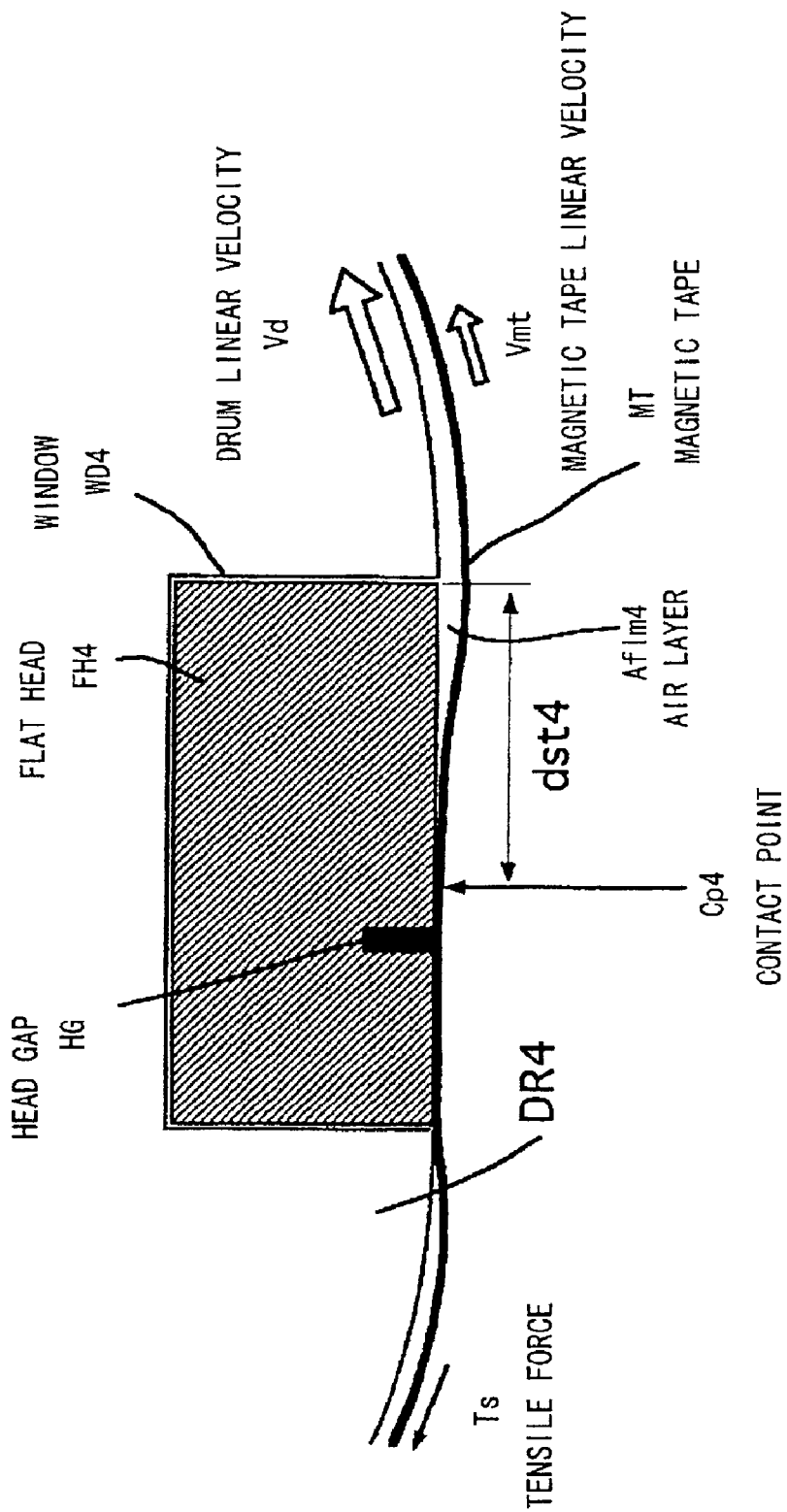
FIG. 8 is a principle explanatory drawing of a fourth embodiment of the rotary magnetic head mechanism of the present invention.

FIG. 8 is a schematic diagram of a rotary drum working as a principal component of a fourth embodiment of the rotary magnetic head mechanism of the present invention.

As shown in this drawing, a plurality of windows WD4 are provided at predetermined positions on the cylindrical surface capable of rotating with an axis of the rotary drum DR4 of the rotary magnetic head mechanism RHA4 as a center, and a flat head FH4 is embedding in each window WD4. In order to make the illustration simple, the other windows and flat heads are omitted in the drawing. On this rotary drum DR4, the magnetic tape MT is given the tensile force Ts and runs at a magnetic tape linear velocity Vmt is loaded, while the cylindrical surface of the rotary drum DR4 rotates at a drum linear velocity Vd.

The flat head FH4 is a head based on the magnetic induction principle and is set so as to be rectangular and so that the edges in the longitudinal direction of the cylindrical surface has the same height as the window WD4, that is, the same level as the cylindrical surface of the rotary drum DR4 and the flat head FH4 fulfills the whole inside of the window WD4.

The portion of the flat head FH4 which faces the magnetic tape MT is a surface and in the present embodiment, is a smooth flat surface processed with a flat finish.

In addition, this surface may be a smooth curved surface having a curvature gentler than the curvature of the rotary drum DR4. This surface is to produce hydrodynamic interference with the facing magnetic tape MT.

On this smooth flat surface, a head gap HG is formed as a recording/reproducing portion and its position is set in the range where the magnetic tape MT contacts the surface by hydrodynamic interference.

To explain the operation, the magnetic tape MT partially placed on the air film formed along the cylindrical surface of the rotary drum DR4 reaches the flat head FH4 keeping its state. Since the fact that the surface roughness of the smooth flat surface of the flat head FH4 is gentler than the surface roughness of the cylindrical surface of the rotary drum DR4 and its shape is flat, the turbulent basin formed there is minimized and therefore the pressure reduction between the magnetic tape MT and the smooth flat surface based on the layer basin which is higher in uniformity in a flow direction is more effective than that on the cylindrical surface of the rotary drum DR4. Accordingly, by drawing out the air existing between the smooth flat surface and the magnetic tape MT, the pressure reduction is produced and the air layer Aflm4 existing between the smooth flat surface and the magnetic tape MT is reduced gradually in a thickness as the flat head FH4 rotates. As a result, the magnetic tape MT approaches the smooth flat surface and contacts the smooth flat surface at a contact point Cp4. A micro explanation of the contact state is the same as the above described. Moreover, the distance dst4 from the edge portion of the flat head FH4 to the contact point Cp4 is regulated by the state of the air flow in the edge portion of the flat head FH4, that is, the amount and the flow velocity of the air supplied from the air film, the surface roughness of the smooth flat surface, the surface roughness of the magnetic tape MT and the like.

When the contact state is established as described above, because this contact state is maintained after the contact point Cp4, the magnetic tape Mt contacts the head gap HG disposed further behind the contact point Cp4 and a steady contact pressure can be obtained.

To explain further about the contact pressure to the head gap HG, in the present embodiment as described above, since the contact on a large area of the magnetic tape MT to the smooth flat surface of the flat head FH4 by the effect of the pressure reduction are utilized, the contact pressure to the head gap HG can be sufficiently minimized and yet the contact pressure having no problematic magnetic induction effect can be steadily obtained. Accordingly, for example, unlike the conventional configuration, it is not necessary to contact-press the magnetic tape compulsively against the head by the tensile force and therefore friction of the head can be extremely minimized and the problem relating to friction of the head can be solved. Thereby, not only the life of the head can be lengthen, but also the life of the tape can be lengthen by avoiding the non-reversal deformation of the magnetic tape MT by minimizing a load on the magnetic tape MT.

Moreover, since friction of the head is minimized, the gap depth of the head gap HG (not shown) is shallow and can be constituted in size, for example, to a degree of a few microns or less, thereby being capable of improving a head performance and performing a high density recording/reproducing at a high sensitivity.

Moreover, since friction of the head is minimized, even if the magnetic tape is brought into contact with the head, the MR head and the GMR head of the magnetic resistance effect type (or magnetic flux response type) which detects a change in the magnetic field on the recording medium by an extremely shallow gap by using the magnetic resistance effect can be applied instead of the magnetic induction type head.

Figure 9:
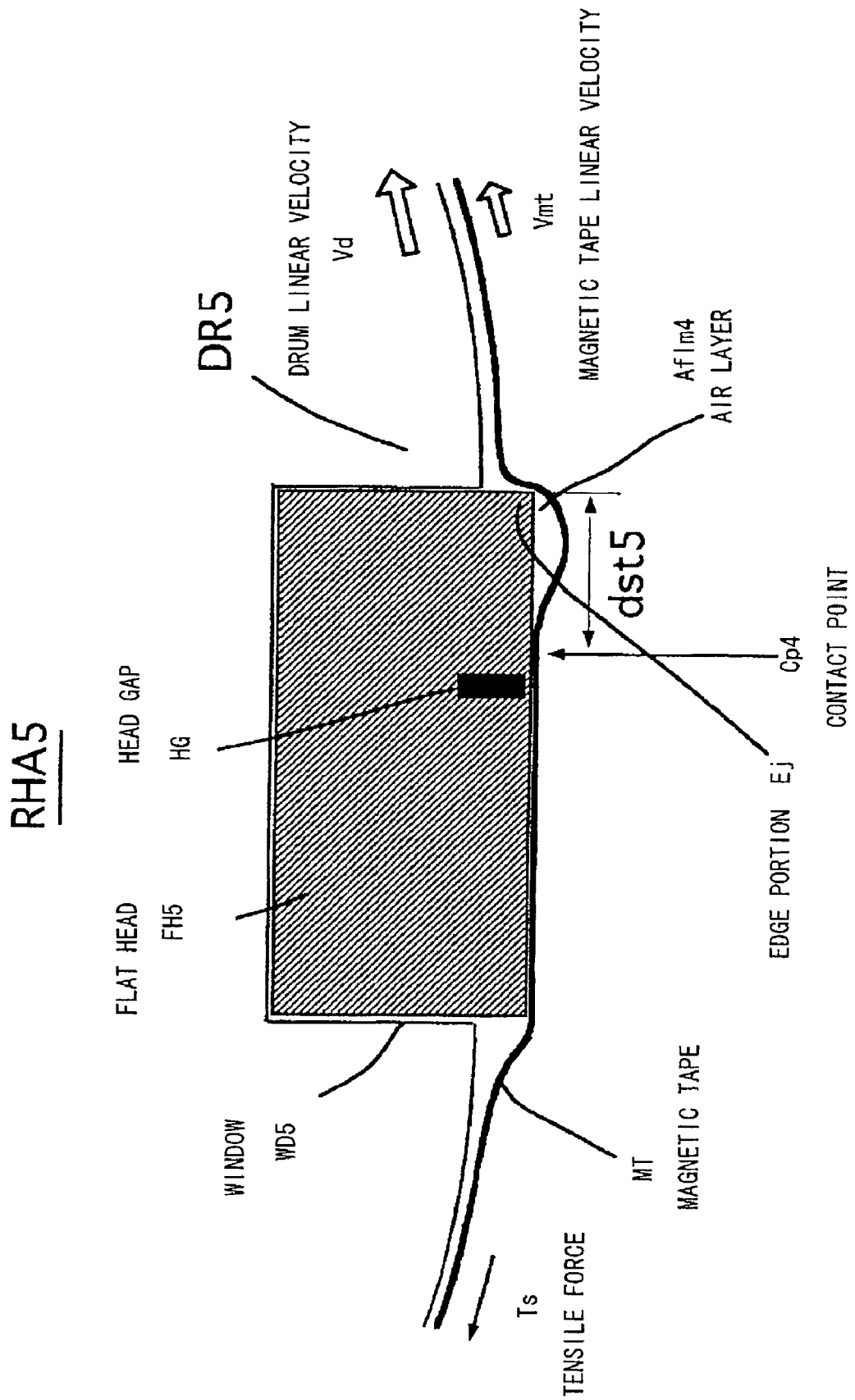
FIG. 9 is a principle explanatory drawing of a fifth embodiment of the rotary magnetic head mechanism of the present invention.
Figure 10:
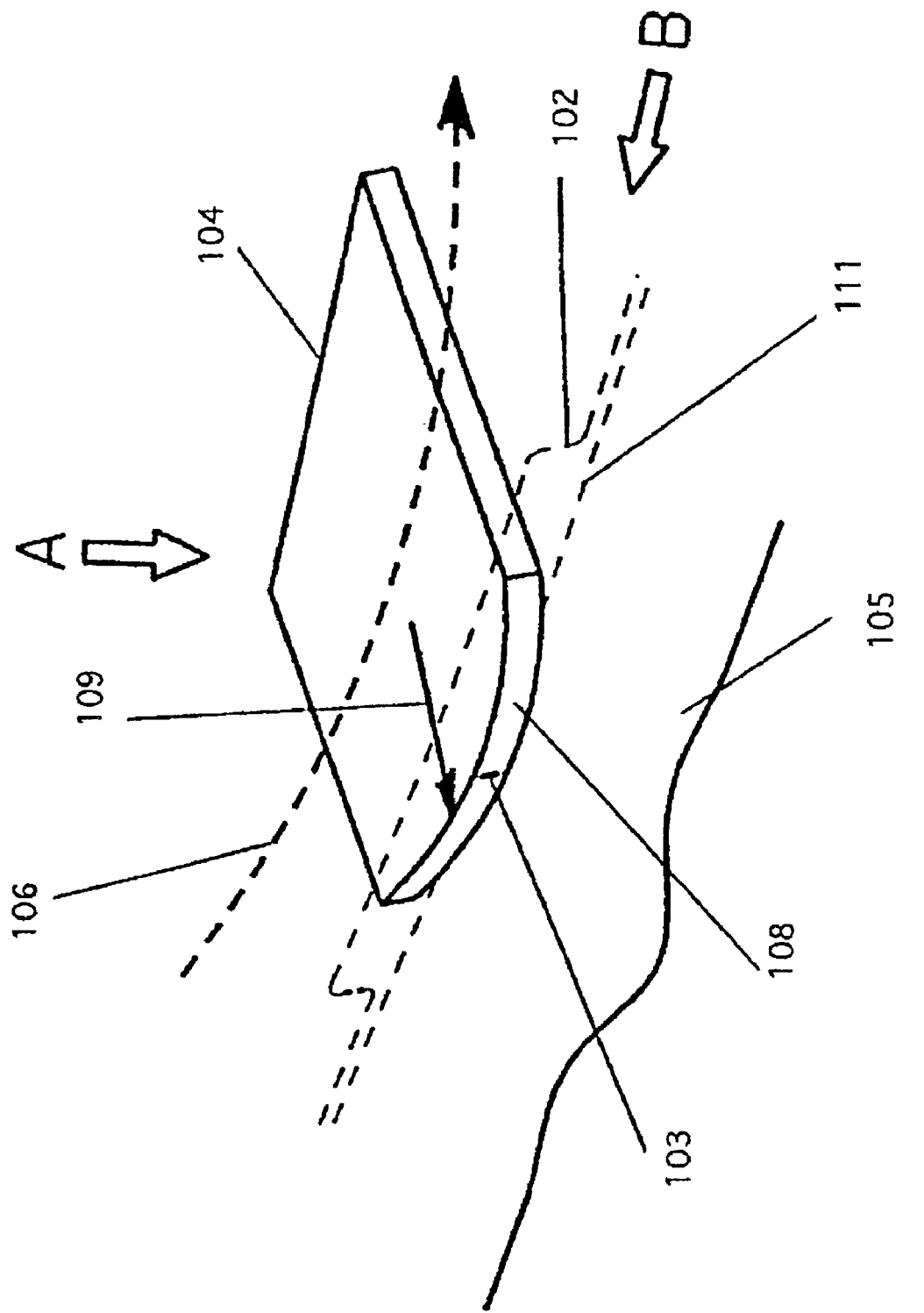
FIG. 10 is a schematic view explaining the configuration of the conventional rotary drum type head.
Figure 11:
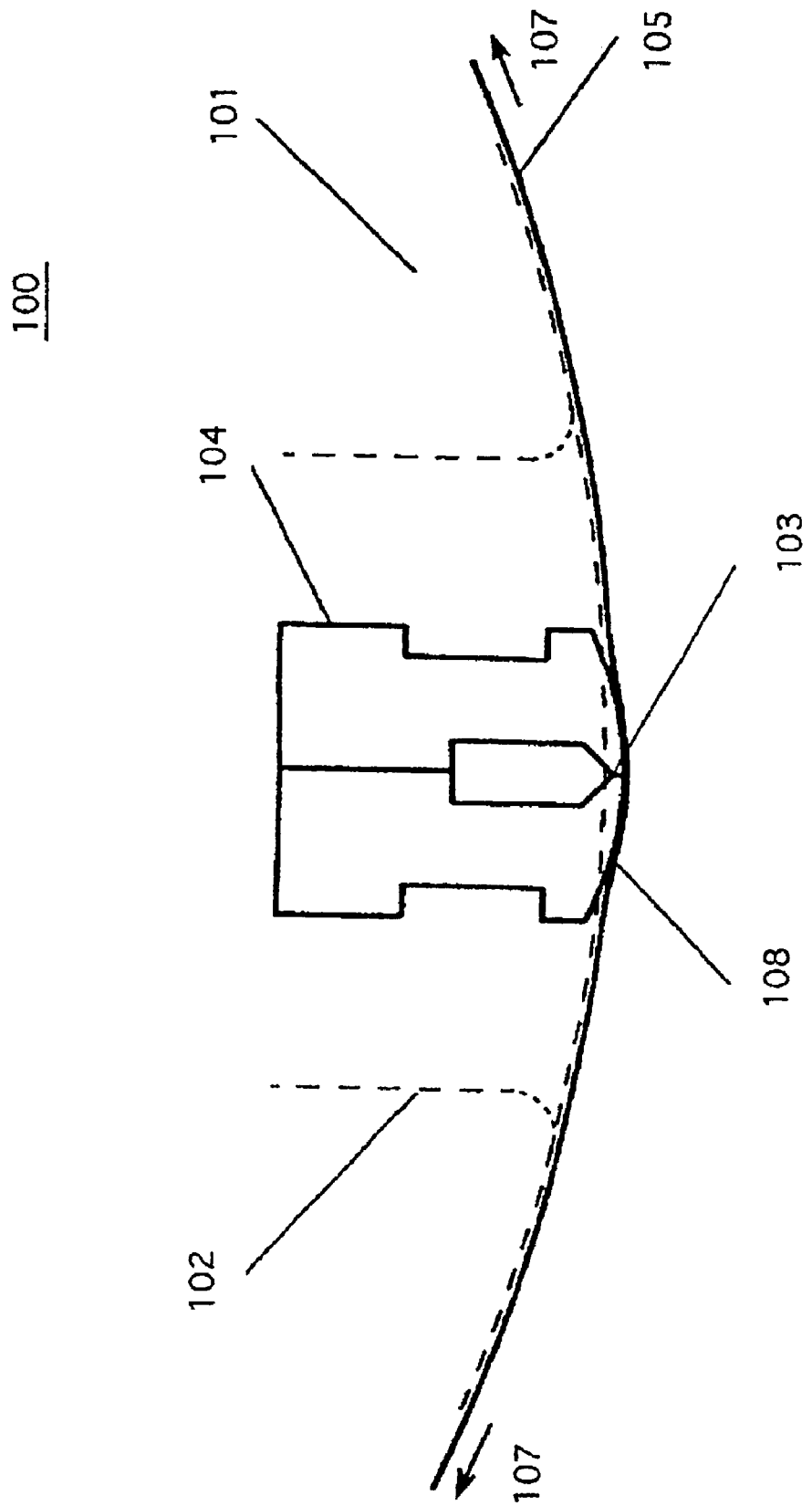
FIG. 11 is a diagram viewed from the direction of arrow A in FIG. 10.
Figure 12:
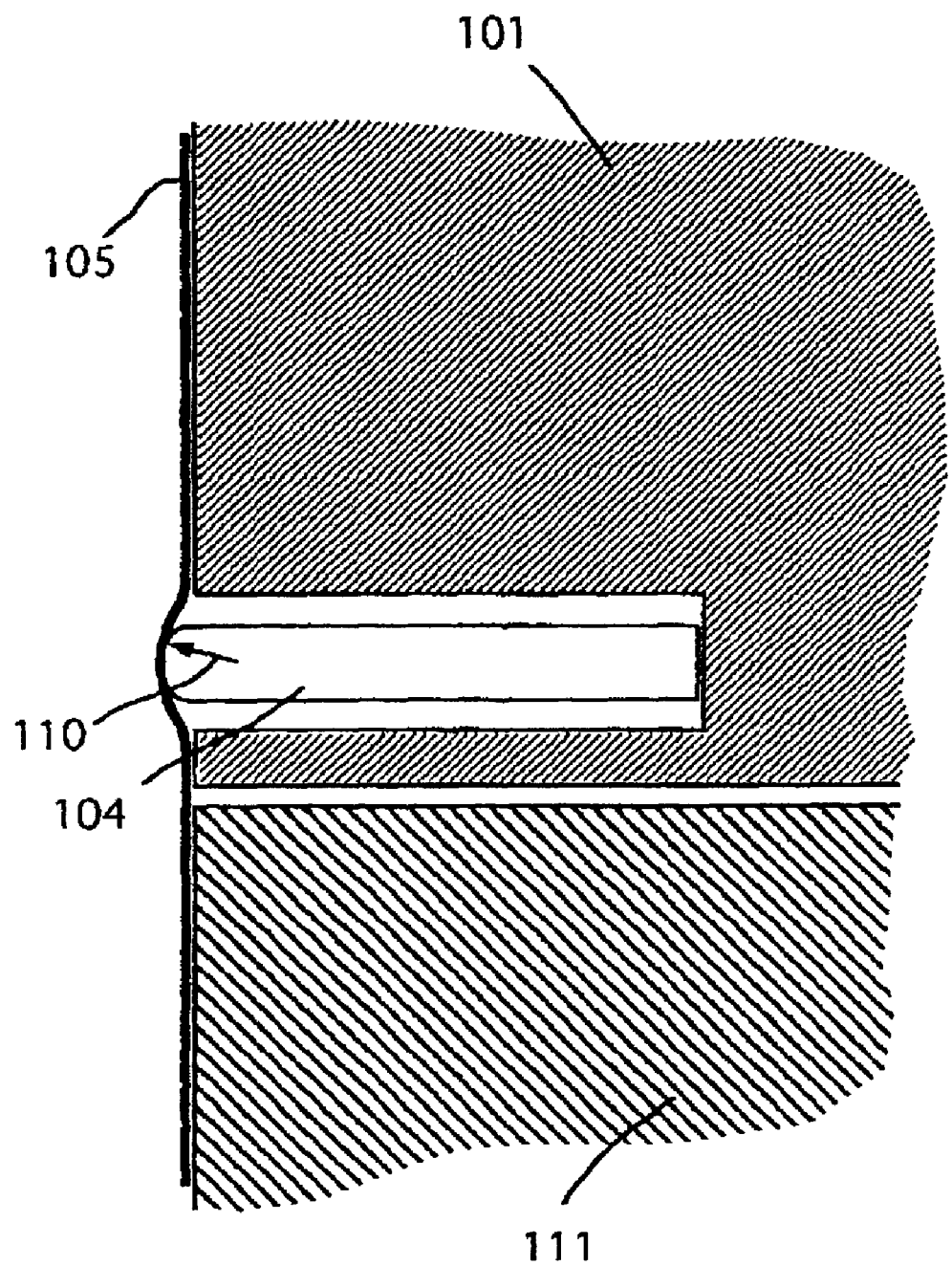
FIG. 12 is a diagram viewed from the direction of arrow B in FIG. 10.

FIG. 9 is a schematic drawing of the rotary drum which is a principal component of a fifth embodiment of the rotary magnetic head mechanism of the present invention.

As shown in this drawing, a plurality of windows WD5 are formed at predetermined positions of the cylindrical surface capable of rotating with an axis of the rotary drum DR5 possessed by the rotary magnetic head mechanism RHA5 as a center, and a flat head FH5 is embedded in each window WD5. In order to make the illustration simple, the other windows and flat heads are omitted in the drawing. On this rotary drum DR5, the magnetic tape MT is given the tensile force Ts and runs at a magnetic tape linear velocity Vmt is loaded, while the rotary drum DR5 moves at a drum linear velocity Vd.

The flat head FH5 is a head based on the magnetic induction principle and is set so as to be rectangular, to project from the cylindrical surface of the rotary drum DR5 and to fulfill the whole inside of the window WD5.

The portion of the flat head FH5 which faces the magnetic tape MT is a surface and in the present embodiment, is a smooth flat surface processed with a flat finish.

Further, this surface may be a smooth curved surface having a curvature gentler than the curvature of the rotary drum DR5. Here, the surface is to produce hydrodynamic interference with the facing magnetic tape MT.

On this smooth flat surface, a head gap HG is formed as a recording/reproducing portion and its position is set in the range where the magnetic tape MT contacts the surface by hydrodynamic interference.

To describe the operation, the magnetic tape MT partially placed on the air film formed along the cylindrical surface of the rotary drum DR5 reaches the flat head FH5 keeping this state and turns its locus outward by colliding with the edge portion Ej and runs upward from the flat head FH5 by stiffness of the magnetic tape MT and peaks by a balance against the tensile force Ts given to the magnetic tape MT.

On the other hand, in the rising space formed between the smooth flat surface of the flat head FH5 and the magnetic tape MT, the pressure reduction similar to each of the above described embodiments is effective. Moreover, the air layer Aflm5 existing between the smooth flat surface and the magnetic tape MT is gradually reduced in a thickness as the flat head FH5 rotates and as a result, the magnetic tape MT approaches the smooth flat surface and contacts the smooth flat surface at a contact point Cp5. The micro explanation of the contact state is the same as described above. Moreover, the distance dst5 from the edge portion Ej of the flat head FH5 to the contact point Cp5 is shortened further than the distance dst4 shown in the above described FIG. 8 because the air flow from the air film held by the rotary drum DR5 is shut out by the magnetic tape MT which collides with the edge portion Ej. Accordingly, the flat head FH5 can be minimized.

When the contact state is established as described above, since this contact state is maintained after the contact point Cp5, the magnetic tape MT contacts the head gap HG disposed further behind the contact point Cp5 and a steady contact pressure can be obtained.

To explain in more detail about the contact pressure to the head gap HG, in the present embodiment as described above, because the contact on a large area of the magnetic tape MT to the smooth flat surface of the flat head FH5 by the pressure reduction effect is utilized, the contact pressure to the head gap HG can be sufficiently minimized and yet the contact pressure having no problematic magnetic induction effect can be steadily obtained. Accordingly, for example, unlike the conventional configuration, it is not necessary to contact-press the magnetic tape compulsively against the head by the tensile force and therefore friction of the head can be extremely minimized and the problem caused by the friction of the head can he solved. Thereby, not only the life of the head can be lengthen, but also the life of the tape can be lengthen by avoiding the non-reversal deformation of the magnetic tape MT by minimizing a load on the magnetic tape MT.

Moreover, since friction of the head is minimized, the gap depth of the head gap HG (not shown) is shallow and can be constituted in size, for example, to a degree of a few microns or less, thereby being capable of improving a head performance and performing a high density recording/reproducing at a high sensitivity.

Moreover, since friction of the head is minimized, even if the magnetic tape is brought into contact with the head, the MR head and the GMR head of the magnetic resistance effect type (or magnetic flux response type) which detects a change in the magnetic field on the recording medium at an extremely shallow gap by the magnetic resistance effect can be applied instead of the magnetic induction type head.

Moreover, in the method of recording and reproducing on/from the tape magnetic recording medium of the present invention, the smooth flat surface or the smooth curved surface having the curvature gentler than the curvature of the rotary drum is formed on the surface of the rotary drum having the cylindrical surface, and the recording/reproducing portion that produces magnetic interference with the magnetic tape MT is formed on the smooth flat surface or the smooth curved surface, thereby allowing the magnetic tape MT to approach the rotating rotary drum so that at least either recording or reproducing is performed by bringing the recording/reproducing portion into contact with the magnetic tape MT by the pressure reduction caused by hydrodynamic interference between the smooth flat surface or the smooth curved surface and the magnetic tape MT.

In addition, this pressure reduction makes the distance between the magnetic tape MT and the recording/reproducing portion closer than a maximum distance that the mutual magnetic interference can be produced, which is capable of performing at least recording or reproducing.

According to this recording/reproducing method, since the surface is the smooth flat surface or the smooth curved surface, the pressure reduction according to Bernoulli's law is generated between the surface and the approached magnetic tape MT. As a result, the magnetic tape MT gradually approaches and contacts the surface. Therefore, the recording/reproducing portion can be in a contact state with the magnetic tape MT and only by the pressure reduction effect without compulsive force, the contact pressure is secured, so that recording or reproducing can be performed with friction controlled.

Moreover, the contact point is stabilized in a steady state and a rising distance of the magnetic tape MT at the immediately preceding position from the contact position becomes a steady value and a steady non-contact state can be maintained. Accordingly, when the recording/reproducing portion of the non-contact type, for example, the reproducing head element of the magnetic resistance detection system is disposed at this position, recording/reproducing on/from the magnetic tape MT can be performed in a non-contact also in the rotary magnetic recording.

As described above, according to the present invention, the following advantages can be realized.
1. Contact pressure to head can be sufficiently minimized and the contact pressure having no problem on magnetic induction effect can be steadily obtained.
2. The problems due to friction of the head can be solved and not only the life of the head can be lengthen, but also the life of the magnetic tape MT can be lengthen.
3. Since the gap can be made shallow, a high density recording/reproducing can be performed at a high sensitivity.
4. The head can be made compact.
5. The MR head and the GMR head of the magnetic resistance effect type (or magnetic flux response type) which detects a change in the magnetic field on the recording medium by an extremely shallow gap by utilizing the magnetic resistance effect, as the configuration where the magnetic tape is brought into contact with the head, can be applied for a tape magnetic recording medium in a contact form.
6. Moreover, although the head surface portion that produces hydrodynamic interference with the magnetic tape is brought into contact with the magnetic tape, by not making the head element that produces magnetic interference with the magnetic tape contact with the magnetic tape, the non-contact head including the MR head and the GMR head can be applied for a tape magnetic recording medium in a non-contact form.

As described above in detail, in the magnetic head according to claim 1 of the present invention, the surface that produces hydrodynamic interference with the tape magnetic recording medium is the smooth flat surface to make the magnetic tape recording medium contact the surface, and the recording/reproducing portion that produces magnetic interference is provided in the area where the tape magnetic recording medium contacts the surface. Then, the pressure reduction according to the Bernoulli's law is produced between the surface of the smooth flat surface and the tape magnetic recording medium approaching the smooth flat surface. As a result, without applying compulsive force, the tape magnetic recording medium is brought into contact with the surface and also with the recording/reproducing portion. As described above, only by the pressure reduction effect, the contact pressure to the recording/reproducing portion can be secured, so that friction can be controlled and recording or reproducing can be performed.

In the magnetic head according to claim 2 of the present invention, the surface that produces hydrodynamic interference with the tape magnetic recording medium is the smooth flat surface to make the tape magnetic recording medium contact the surface, and the recording/reproducing position that produces magnetic interference in a non-contact state with the tape magnetic recording medium is placed at a place other than an area where the surface contacts the tape magnetic recording medium. Therefore, the pressure reduction according to Bernoulli's law occurs between the surface of the smooth flat surface and the tape magnetic recording medium approaching the smooth flat surface. As a result, without applying compulsive force, the tape magnetic recording medium is brought into contact with the surface. On the other hand, at a part other than the contact portion, a steady non-contact state of the tape magnetic recording medium is maintained. Accordingly, when the recording/reproducing portion of the non-contact type, for example, the reproducing head element of the magnetic resistance detection system is disposed at this position, recording/reproducing on/from the tape magnetic recording medium can be performed in a non-contact state also in the rotary magnetic recording. Therefore, non-contact-type recording or reproducing can be performed without causing friction.

The magnetic head according to claim 3 of the present invention is the head according to claim 1 or claim 2, and since the surface is the smooth curved surface having the curvature gentler than the curvature of the rotary drum, the pressure reduction on the surface having the smooth curvature is very effective. Accordingly, this enables the operation in which the tape magnetic recording medium is brought into contact with the magnetic head by the pressure reduction effect without contacting the rotary drum, or the operation in which the tape magnetic recording medium is brought into contact with the rotary drum by soft contact pressure, while bringing it into contact with the magnetic head by desired contact pressure produced by much further pressure reduction effect.

In the recording and reproducing method for the tape magnetic recording medium according to claim 4 of the present invention, the recording/reproducing portion that produces magnetic interference with the tape magnetic recording medium is formed on the smooth flat surface or on the gentle smooth curved surface disposed on the surface of the rotary drum, and the tape magnetic recording medium is brought into contact with the recording/reproducing portion by the pressure reduction occurring between the tape magnetic recording medium and the smooth flat surface or the smooth curved surface, or the distance between the tape magnetic recording medium and the recording/reproducing portion decided by the pressure reduction is made close to the minimum distance in which the mutual interference occurs, so as to perform recording or reproducing. As a result, the tape magnetic recording medium approaches and contacts the surface by the pressure reduction produced between the surface and the approaching tape magnetic recording medium. Thereby, the recording/reproducing portion is put into a contact state with the tape magnetic recording medium, and only by the pressure reduction effect without applying compulsive force, the contact pressure is secured so that friction is controlled and recording or reproducing can be performed.

Moreover, the rising distance of the tape magnetic recording medium becomes steady just before the contact position, so that the steady non-contact state is maintained. Accordingly, when the recording/reproducing portion of the non-contact type, for example, the reproducing head element of the magnetic resistance detection system is disposed at this position, even in the case of a rotary magnetic recording, recording/reproducing can be performed in a non-contact state on/from the tape magnetic recording medium.

The rotary magnetic head mechanism according to claim 5 of the present invention comprises the rotary drum having the cylindrical surface and the magnetic head. The magnetic head comprises a surface that is the smooth flat surface, and a recording/reproducing portion which is provided in the area where the tape magnetic recording medium contacts the surface to perform recording or reproducing by magnetic interference. In addition, each portion of the magnetic head is not higher than the cylindrical surface of the rotary drum. As a result, the tape magnetic recording medium is brought into contact with the surface portion by the pressure reduction generated by hydrodynamic interference between the surface of the smooth flat surface and the tape magnetic recording medium. At the same time, the tape magnetic recording medium is brought into contact with the recording/reproducing portion. Thereby, only by the pressure reduction effect without applying the compulsive force, the contact pressure to the recording/reproducing portion is secured so that friction is controlled and recording or reproducing is performed.

The rotary magnetic head mechanism according to claim 6 of the present invention comprises the rotary drum having the cylindrical surface and the magnetic head. The magnetic head comprises the surface that is the smooth flat surface, and the recording/reproducing portion that is disposed in the area where the tape magnetic recording medium contacts the surface to perform recording or reproducing by the magnetic interference. In addition, the magnetic head is disposed so as to project from the cylindrical surface of the rotary drum. As a result, the tape magnetic recording medium can be easily brought into contact with the projecting magnetic head end portion, so that the magnetic head can be made minimized.

Moreover, the tape magnetic recording medium is brought into contact with the surface by the pressure reduction generated by hydrodynamic interference generated between the surface of the smooth flat surface and the tape magnetic recording medium and, at the same time, the tape magnetic recording medium is brought into contact with the recording/reproducing portion. Thereby, only by the pressure reduction effect without applying compulsive force, the contact pressure to the recording/reproducing portion is secured, so that friction is controlled and recording or reproducing can be performed.

In the rotary magnetic head mechanism according to claim 7 of the present invention, the rotary drum is provided with the cylindrical surface, the window portion, the concave channel inside the window portion and the magnetic head provided over the channel. The magnetic head comprises the surface that is a smooth flat surface, and,the recording/reproducing portion that is provided in the area where the tape magnetic recording medium is brought into contact with the surface to perform recording or reproducing by the magnetic interference. In addition, each portion of the magnetic head is not higher than the cylindrical surface of the rotary drum. As a result, the negative pressure generated on the concave channel attracts the passing tape magnetic recording medium, the tape magnetic recording medium approaches and contacts the magnetic head end portion, so that the air flow drawn out from the channel is controlled and shut out, then the air flow formation on the magnetic head is controlled. Moreover, the tape magnetic recording medium is brought into contact with the surface by the pressure reduction effect generated by hydrodynamic interference between the surface of the smooth flat surface and the tape magnetic recording medium and, at the same time, the tape magnetic recording medium is brought into contact with the recording/reproducing portion. Thereby, only by the pressure reduction effect without applying compulsive force, the contact pressure to the recording/reproducing portion is secured, so that friction is controlled and recording or reproducing can be performed.

In the rotary magnetic head mechanism according to claim 8 of the present invention, the provided rotary drum comprises the cylindrical surface, the window portion, the concave channel inside the window portion and the magnetic head provided over the channel. The magnetic head comprises the surface that is a smooth flat surface and the recording/reproducing portion that is disposed in the area where the tape magnetic recording medium are brought into contact with the surface to perform recording or reproducing by magnetic interference. In addition, the magnetic head is formed so as to project from the cylindrical surface of the rotary drum. As a result, the negative pressure generated in the concave channel attracts the passing tape magnetic recording medium and, moreover, since the magnetic head projects from the cylindrical surface, the tape magnetic recording medium effectively approaches or contact the magnetic head end portion, so that the air flow drawn out from the channel is controlled or shut out and the air flow formation on the magnetic head is effectively controlled.

Moreover, by the pressure reduction generated by hydrodynamic interference between the surface of the smooth flat surface and the tape magnetic recording medium and also by controlling the above described air flow formation, the tape magnetic recording medium is rapidly approached and brought into contact with the surface and, at the same time, the tape magnetic recording medium is brought into contact with the recording/reproducing portion. Thereby, only by the pressure reduction effect without applying compulsive force, the contact pressure to the recording/reproducing portion is secured, so that friction is controlled and recording or reproducing can be performed.

The rotary magnetic head mechanism according to claim 9 of the present invention is indicated by any one of claim 5, 6, 7 or 8 and the surface of the magnetic head is the smooth curved surface having the curvature gentler than the curvature of the rotary drum and therefore the pressure reduction on the surface having a smooth curvature is very effective. Accordingly, this enables the operation in which the tape magnetic recording medium is brought into contact with the magnetic head by the pressure reduction effect without bringing it into contact with the rotary drum, or the operation in which the tape magnetic recording medium is brought into contact with the rotary drum by soft contact pressure while bringing it into contact with the magnetic head by desired contact pressure generated by much stronger pressure reduction effect.

INDUSTRIAL APPLICABILITY

The present invention can be utilized for a VTR apparatus with a rotary drum based on the digital standards, such as a video cassette recorder apparatus with a rotary drum for recording and reproducing a signal on/from a tape magnetic recording medium, a rotary magnetic head used in the above apparatus, and a magnetic head mechanism.

The invention claimed is:

1. A magnetic head which is mounted on a rotary drum capable of allowing a tape magnetic recording medium to run thereon and moves with the rotation of said rotary drum, so as to perform recording on said tape magnetic recording medium or reproducing from said tape magnetic recording medium, said magnetic head comprising:
   a surface for facing said tape magnetic recording medium and for performing hydrodynamic interference with said tape magnetic recording medium while moving by said rotation;
   a recording/reproducing portion for producing magnetic interference with said tape magnetic recording medium in a non-contact state,
   wherein the entire surface for facing said tape magnetic recording medium is a smooth flat surface placed within a cylindrical drum surface,
   wherein a head gap is placed in a range where a magnetic tape is close to a minimum distance capable of producing mutual magnetic recording and reproducing, and
   said recording/reproducing portion is placed outside an area where said tape magnetic recording medium contacts said surface by the hydrodynamic interference and is provided so as to be able to perform at least either recording or reproducing by the magnetic interference with said tape magnetic recording medium in a non-contact state.

2. The magnetic head according to claim 1, wherein said surface facing to said tape magnetic recording medium is a smooth curved surface having a curvature less than the curvature of said rotary drum.

3. A recording and reproducing method for a tape magnetic recording medium,
   wherein an entire surface for facing said tape magnetic recording medium is a smooth flat surface or a smooth curved surface having a curvature less than a curvature of a rotary drum that is placed within a cylindrical drum surface, and a head gap is placed in a range where a magnetic tape is close to a minimum distance capable of producing mutual magnetic recording and reproducing,
   a recording/reproducing portion for producing magnetic interference with a tape magnetic recording medium is placed on said smooth flat surface or on said smooth curved surface, and said tape magnetic recording medium is made close to said rotary drum rotating to occur pressure reduction by the hydrodynamic interference between said smooth flat surface or said smooth curved surface and said tape magnetic recording medium,
   whereby said pressure reduction allows said tape magnetic recording medium to approach said recording/reproducing portion to a distance close to the minimum distance capable of producing mutual magnetic interference to perform at least either recording or reproducing.

* * * * *